US012154544B1

United States Patent
Czuczman et al.

(10) Patent No.: US 12,154,544 B1
(45) Date of Patent: Nov. 26, 2024

(54) SYNTHETIC SPEECH PROCESSING

(71) Applicant: Amazon Technologies, Inc., Seattle, WA (US)

(72) Inventors: Michal Czuczman, Gdansk (PL); You Wang, Cambridge (GB); Masaki Noguchi, Cambridge (GB); Viacheslav Klimkov, Gdansk (PL)

(73) Assignee: Amazon Technologies, Inc., Seattle, WA (US)

( * ) Notice: Subject to any disclaimer, the term of this patent is extended or adjusted under 35 U.S.C. 154(b) by 123 days.

(21) Appl. No.: 17/205,493

(22) Filed: Mar. 18, 2021

(51) Int. Cl.
| G10L 13/08 | (2013.01) |
| G10L 15/05 | (2013.01) |
| G10L 15/16 | (2006.01) |
| G10L 15/187 | (2013.01) |

(52) U.S. Cl.
CPC ............ *G10L 13/08* (2013.01); *G10L 15/05* (2013.01); *G10L 15/16* (2013.01); *G10L 15/187* (2013.01); *G10L 2013/083* (2013.01)

(58) Field of Classification Search
CPC ......... G10L 13/08; G10L 15/05; G10L 15/16; G10L 15/187; G10L 2013/083
See application file for complete search history.

(56) References Cited

U.S. PATENT DOCUMENTS

| 10,872,598 | B2 * | 12/2020 | Arik | G10L 25/30 |
| 11,450,307 | B2 * | 9/2022 | Perucci | G10L 13/08 |
| 11,488,575 | B2 * | 11/2022 | Jia | G10L 13/033 |
| 2018/0268806 | A1 * | 9/2018 | Chun | G10L 13/027 |
| 2018/0330729 | A1 * | 11/2018 | Golipour | G10L 15/26 |
| 2020/0152194 | A1 * | 5/2020 | Jeong | G10L 13/08 |
| 2020/0349922 | A1 * | 11/2020 | Peyser | G06N 3/044 |
| 2020/0394997 | A1 * | 12/2020 | Trueba | G10L 25/18 |
| 2020/0402507 | A1 * | 12/2020 | Neelakantan | G06N 3/08 |
| 2021/0097976 | A1 * | 4/2021 | Chicote | G10L 13/10 |
| 2022/0020355 | A1 * | 1/2022 | Ming | G10L 13/06 |

FOREIGN PATENT DOCUMENTS

WO   WO-2019222591 A1 * 11/2019 ............... G06N 3/08

OTHER PUBLICATIONS

Sun, et al., "MobileBERT: a Compact Task-Agnostic BERT for Resource-Limited Devices," arXiv preprint arXiv:2004-02984, 2020, 13 pages.

* cited by examiner

*Primary Examiner* — Richemond Dorvil
*Assistant Examiner* — Nadira Sultana
(74) *Attorney, Agent, or Firm* — Pierce Atwood LLP

(57) ABSTRACT

A speech-processing system receives input data representing text. An encoder processes segments of the text to determine embedding data, and a decoder processes the embedding data to determine one or more categories associated with each segment. Output data is determined by selecting words based on the segments and categories.

19 Claims, 16 Drawing Sheets

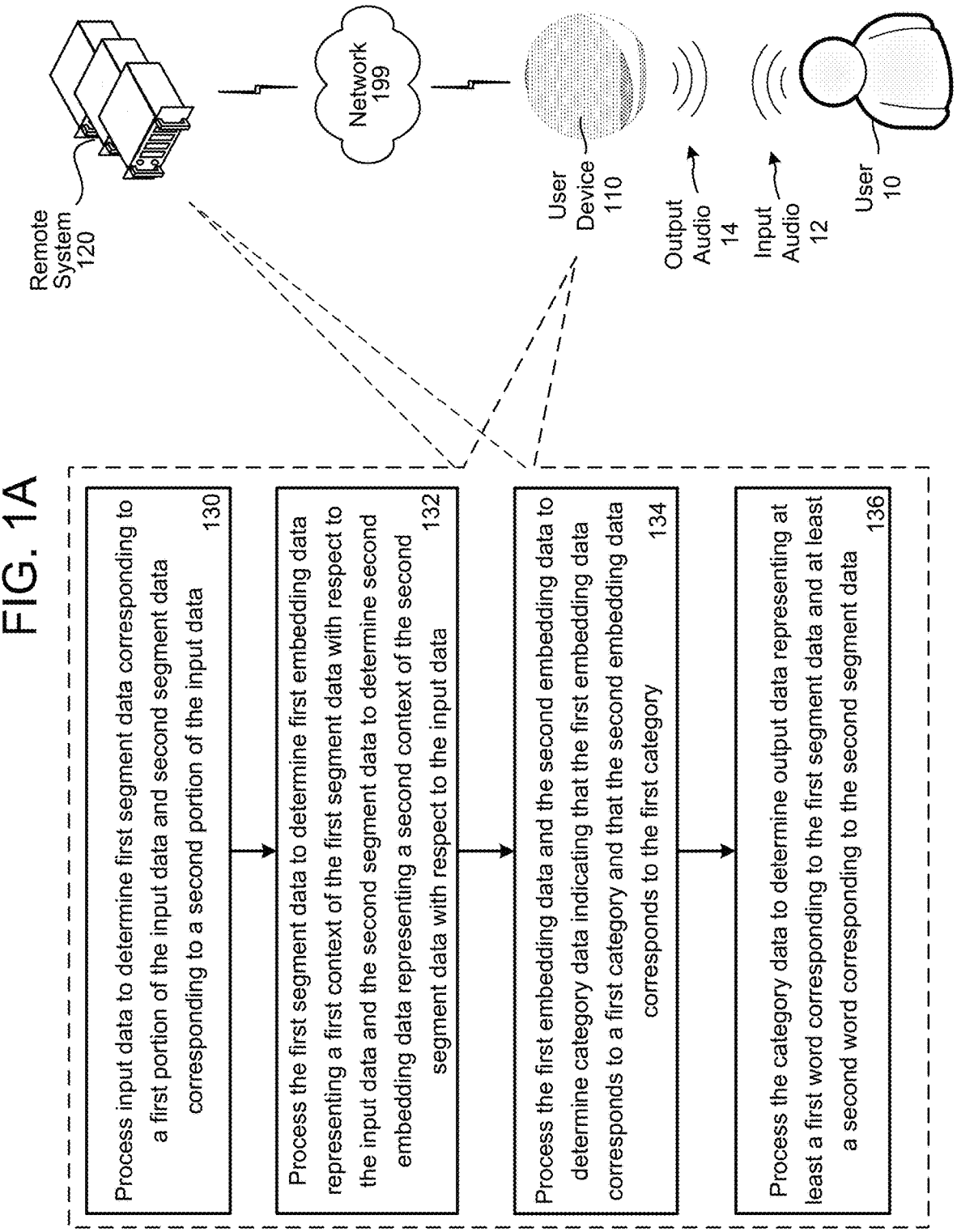

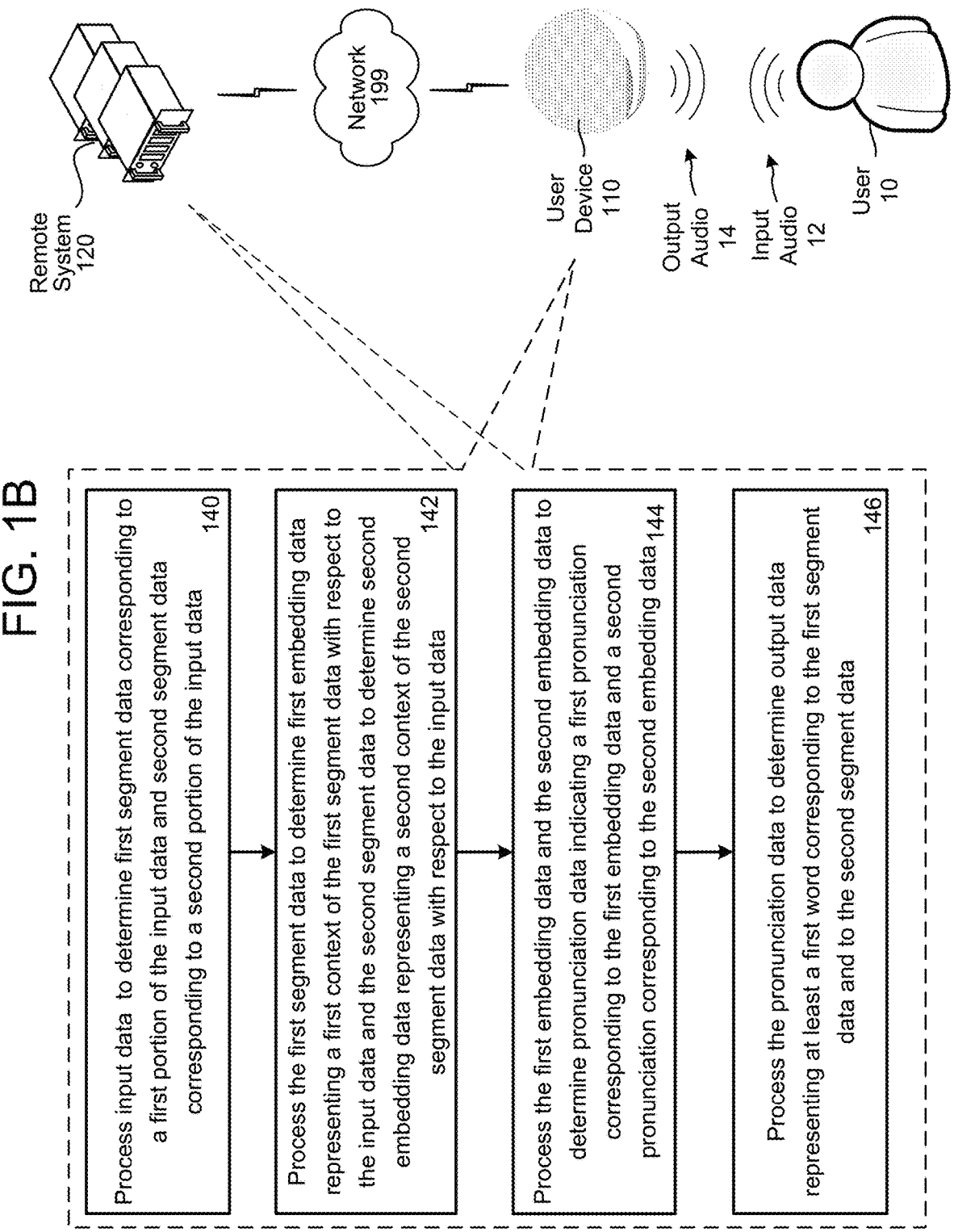

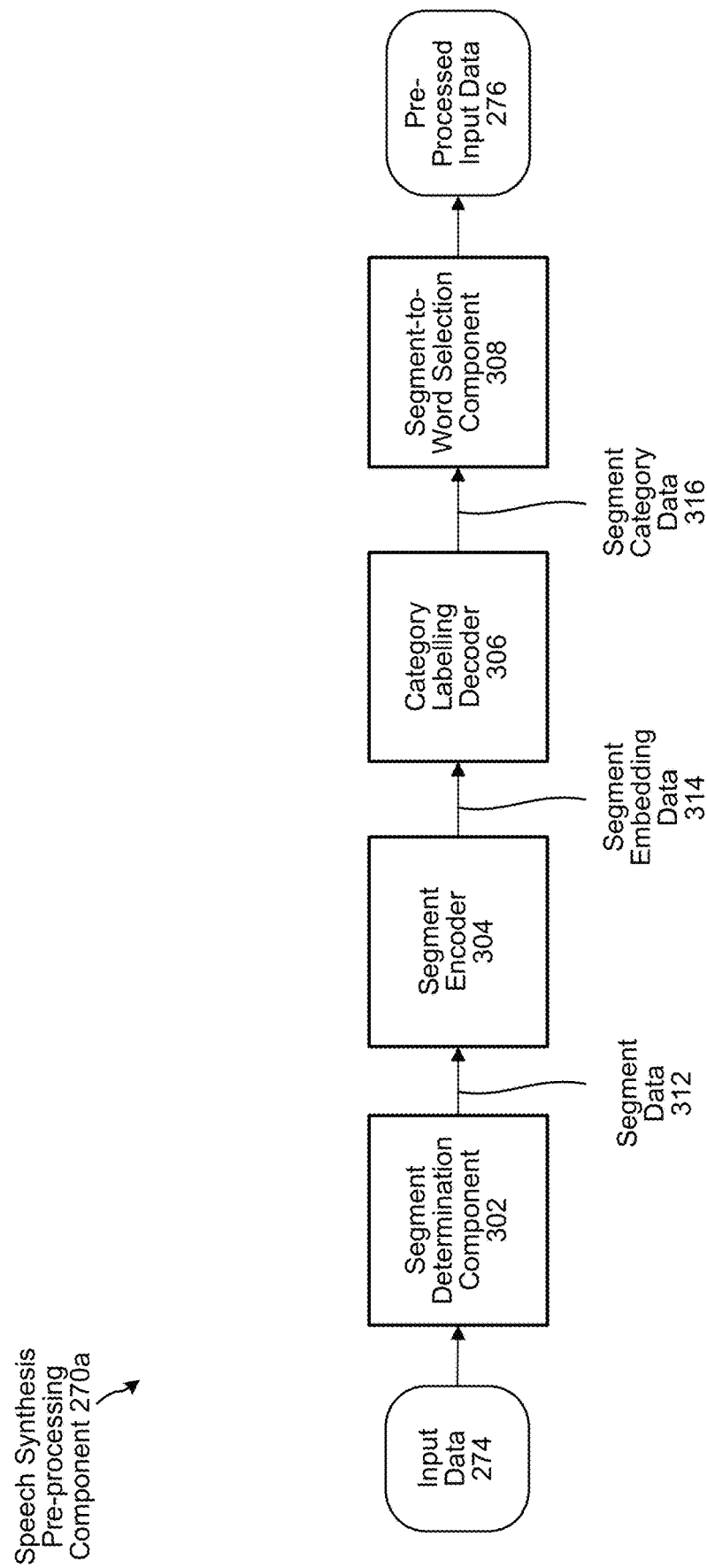

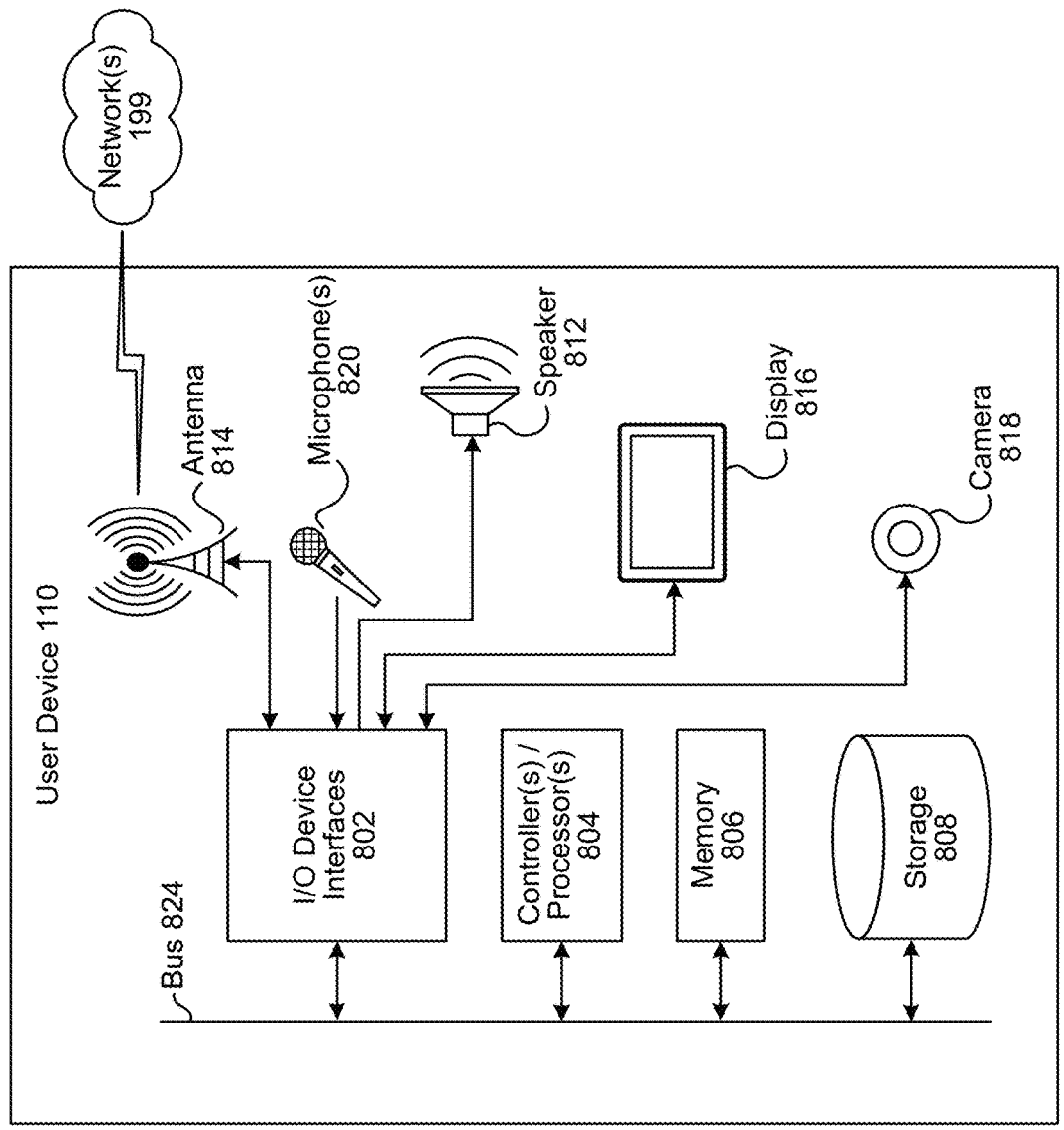

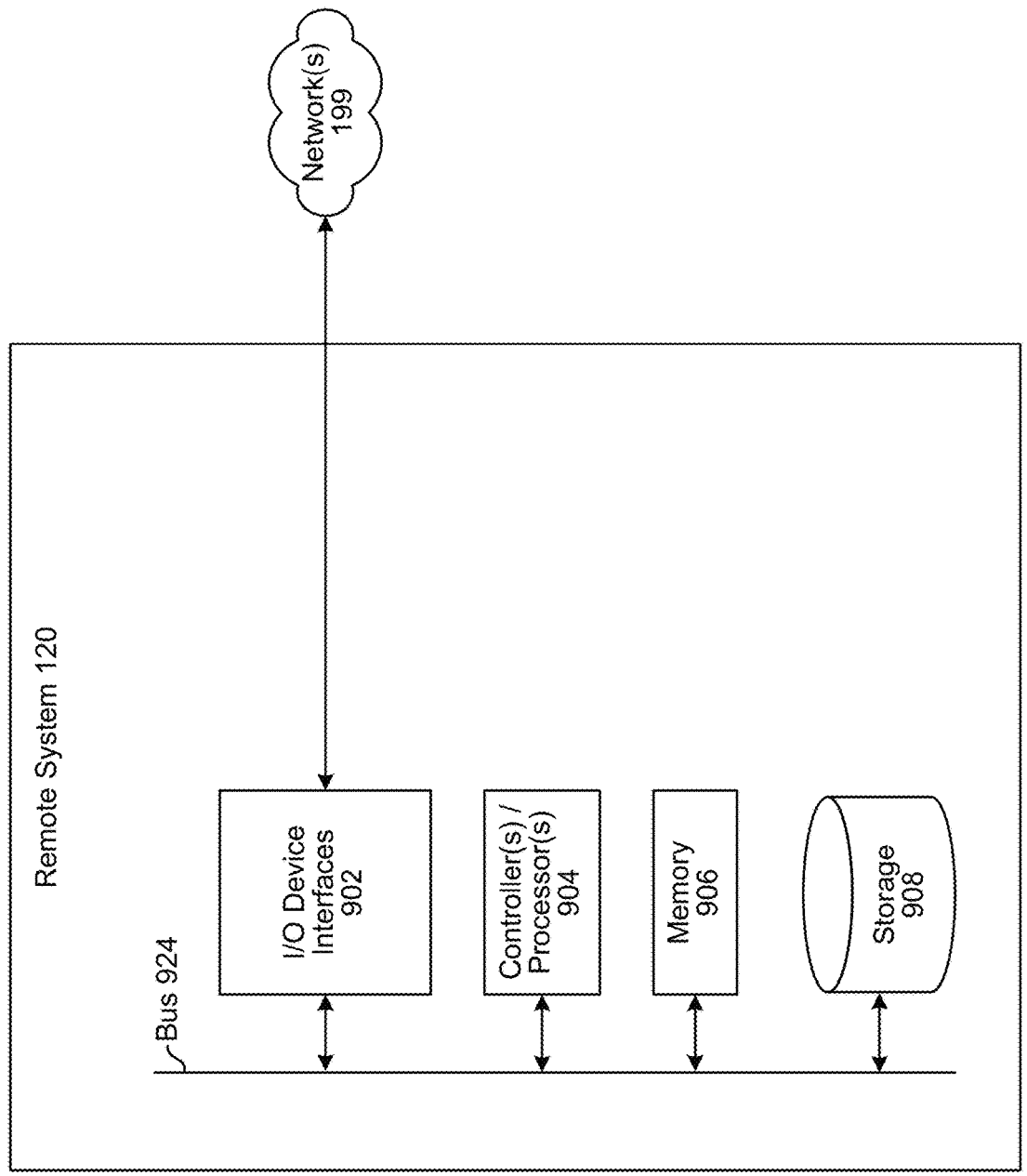

SYNTHETIC SPEECH PROCESSING

BACKGROUND

A speech-processing system includes a speech-synthesis component for processing input data, such as text data, to determine output data that includes a representation of synthetic speech corresponding to the text data. The input data may include text data that has multiple pronunciations that may depend the context of the input data. The speech-processing system may select one of the possible pronunciations for inclusion in the output data.

BRIEF DESCRIPTION OF DRAWINGS

For a more complete understanding of the present disclosure, reference is now made to the following description taken in conjunction with the accompanying drawings.

FIG. 1A illustrates a method for text disambiguation for speech processing according to embodiments of the present disclosure.

FIG. 1B illustrates a method for homograph disambiguation for speech processing according to embodiments of the present disclosure.

FIG. 3A illustrates components for pre-processing input data for speech processing according to embodiments of the present disclosure.

FIG. 8 illustrates components of a user device for speech processing according to embodiments of the present disclosure.

FIG. 9 illustrates components of a remote system for speech processing according to embodiments of the present disclosure.

DETAILED DESCRIPTION

Figure 2A:
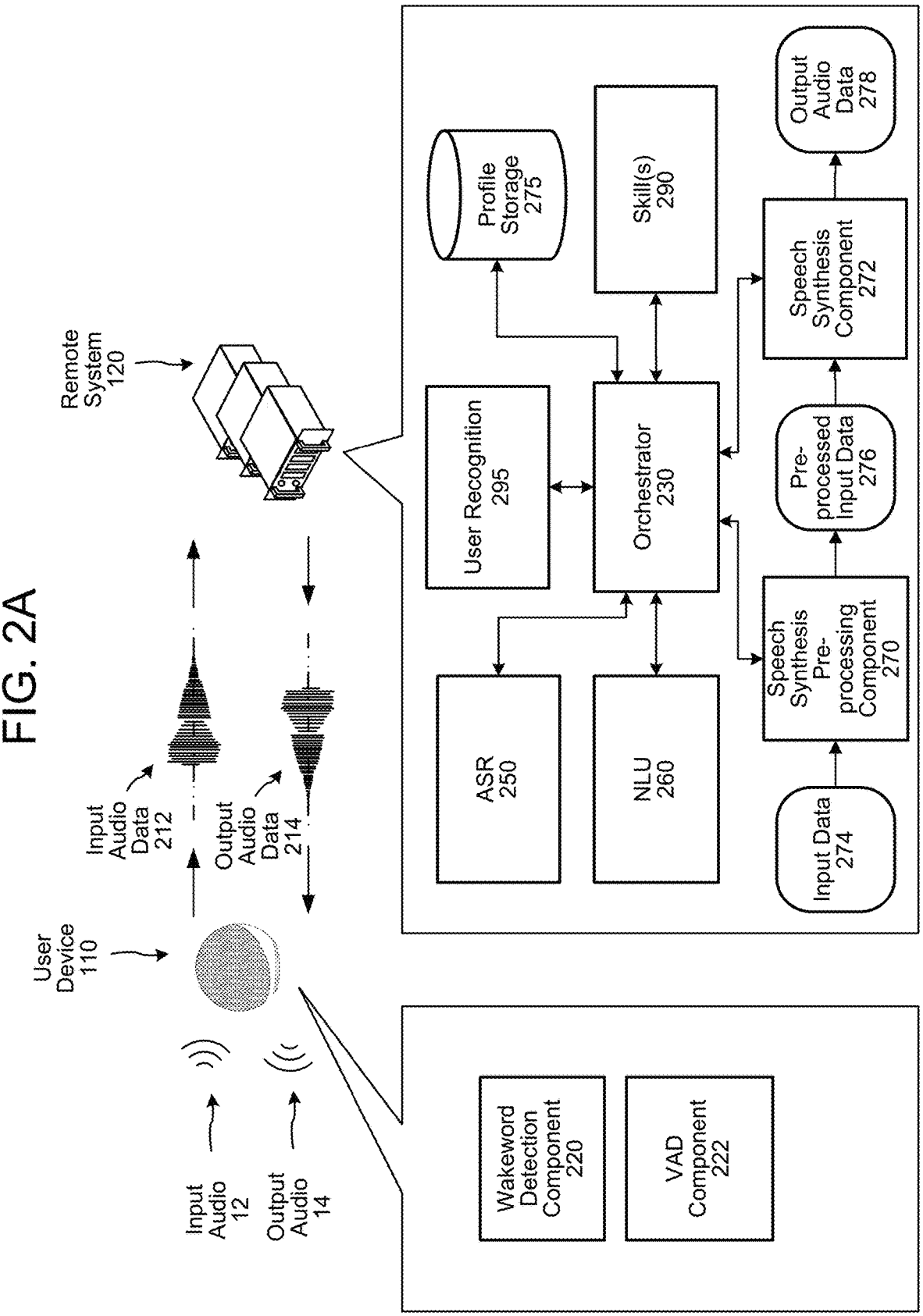
FIG. 2A illustrates components of a user device and of a remote system for speech processing according to embodiments of the present disclosure.

Speech-processing systems may include one or more speech-synthesis components that employ one or more of various techniques to generate synthesized speech from input data (such as text data or other data representing words such as word identifiers, indices or other indicators of words, word embedding data, etc.).

The input data may, however, may contain words, characters, numbers, punctuation marks, or other such types of text that are pronounced one way in some contexts and another way in other contexts. For example, the text "read" may be pronounced as <REED> in some contexts when it is used as a present-tense verb or as <RED> in other contexts when it is used as a past-tense verb. This type of word that may be pronounced differently and have different meanings associated with each pronunciation may be referred to as a homograph, and the process of determining the actual pronunciation may be referred to as homograph disambiguation.

In addition, the input data may contain words, characters, numbers, punctuation marks, or other such types of text that not only have different pronunciations in different contexts but further are associated with different sets of pronounced words. For example, the text "1234" may be pronounced as "one thousand, one hundred, and thirty-four" in a first context, as "one, two, three, four" in a second context, and as "twelve thirty-four" in a third context. The process of finding the actual words to be pronounced, and the pronunciation thereof, may be referred to as text disambiguation.

The process of homograph and/or text disambiguation may be complicated further if the input data also does not include sentence boundaries, such as punctuation, and/or word boundaries, such as spaces. Some kinds of Japanese text, for example, may lack sentence and/or word boundaries. A given character in Japanese input data may thus correspond to a single word, or the character may be joined with one or more other characters to form a word. Processing input data corresponding to such a language may thus also include determining word boundaries.

The speech-synthesis component may include a phoneme encoder for processing the text data and determining phoneme embedding data representing phonemes of the text data and a speech decoder for processing the phoneme encoded data and the predicted features to determine output data representing the speech. In some embodiments, the encoder and decoder may directly process the ambiguous input data to determine output data representing the speech. In other embodiments, the input data may be pre-processed to reduce or remove the ambiguities to determine pre-processed input data, and then the above-described encoder and decoder may process the pre-processed input data to determine the output data. Embodiments of the present disclosure thus describe systems and methods to perform this pre-processing.

In various embodiments, the speech-processing system is disposed on a single device, such as a user device (e.g., Echo device, phone, tablet, Fire TV device, television, personal computer, etc.). In other embodiments, the speech-processing system is distributed across one or more user devices, such as a smartphone or other smart microphone/speaker device, and one or more remote systems, such as one or more server, storage, and/or other type of computing machines. The user device may capture audio that includes human speech and then process the audio data itself and/or transmit the audio data representing the audio to the remote system for further processing. The remote system may have access to greater computing resources, such as more or faster computer processors, than the user device, and may thus be able to process the audio data and determine an appropriate response faster than the user device. The user device may have, for example, a wakeword-determination component that detects presence of a wakeword in audio and transmits corresponding audio data to the remote system only when the wakeword is detected. As used herein, a "wakeword" is one or more particular sequences of sounds, such as "Alexa," "Computer," "Amazon," "Hey Sam", "OK Google," and "Hey Siri," that a user of the user device may say to cause the system to begin processing subsequent audio data, which may further include a representation of a command, such as "tell me a funny story" or "read me the news."

The user device and/or remote system may include an automatic speech-recognition (ASR) component that processes the audio data to determine corresponding text data and a natural-language understanding (NLU) component that processes the text data to determine the intent of the user expressed in the text data and thereby determine an appropriate response to the intent. Determination of the response may include processing output of the NLU component using the speech-synthesis component, also referred to as a text-to-speech (TTS) processing component, to determine audio data representing the response. The user device may determine the response using a speech-synthesis component of the user device or the remote system may determine the response using a speech-synthesis component of the remote system and transmit data representing the response to the user device (or other device), which may then output the response. In other embodiments, a user of a user device may wish to transmit audio data for reasons other than ASR/NLU processing, such as one- or two-way audio communication with one or more other user devices or remote systems.

Referring to FIGS. 1A and 1B, a speech-processing system may perform text disambiguation that includes determining categories corresponding to segments of input data (as shown in FIG. 1A) and/or may perform homograph disambiguation that includes determining pronunciations corresponding to segments of input data (as shown in FIG. 1B). A user 10 may provide input data, such as input audio 12, to a voice-controlled user device 110 or a display-enabled user device (e.g., a device featuring at least one display, such as a smartphone, tablet, or personal computer). The input data may include one or more user gestures directed to the user device, such as a touchscreen input, mouse click, or key press. The input data may further be or include input audio 12. The user device 110 may output audio 14 corresponding to the output data.

The user device 110 may, in some embodiments, receive input audio 12 and may transduce it (using, e.g., a microphone) into corresponding audio data. As explained in further detail herein, the user device 110 may perform additional speech processing or may send the audio data to a remote system 120 for further audio processing via a network 199. Regardless of whether it is performed by the user device 110 or the remote system 120, an ASR component may process the audio data to determine corresponding text data, and an NLU component may process the text data to determine NLU data such as a domain, intent, or entity associated with the text data.

In various embodiments, the user device 110 and/or remote system 120 receives text data representing words. The words may represent a response to a user command, a news story, a book, an article in a newspaper or a magazine, or any other such input data representing words. The input data may directly represent words of the text, such as ACSII data representing the words, or may be a representation of sub-word or sub-syllable sounds (herein referred to as "phonemes") representing the words. The input data may further include metadata corresponding to the text, such as locations of word boundaries, sentence boundaries, or paragraph boundaries.

Referring to FIG. 1A, the user device 110 and/or the remote system 120 may perform text disambiguation of input text data to determine pre-processed input data. Additional details of components for performing text disambiguation are shown in FIG. 3A. The user device 110 and/or the remote system 120 processes (130) input data to determine a sequence of segment data; each segment may represent a portion of the input data, such as a word, punctuation mark, and/or symbol. First segment data may correspond to a first portion of the input data and second segment data may correspond to a second portion of the input data (and so on).

The user device 110 and/or the remote system 120 processes (132) the first segment data to determine first embedding data representing a first context of the first segment data with respect to the input data and the second segment data to determine second embedding data representing a second context of the second segment data with respect to the input data. This processing may be performed by an encoder, such as the encoder illustrated in FIG. 5, which may include a transformer. The embedding data may represent context information, such as a position of the portion in the input data and a relationship of the portion with respect to other portions of the input data.

The user device 110 and/or the remote system 120 processes (134) the first embedding data and the second embedding data to determine category data indicating that the first embedding data corresponds to a first category and that the second embedding data corresponds to the first category. This processing may be performed by a decoder consisting of one or more classifiers.

The user device 110 and/or the remote system 120 processes (136) the category data to determine output data representing at least a first word corresponding to the first segment data and at least a second word corresponding to the second segment data. This processing may be performed by a component that translates segments to words based at least in part on the associated categories, and may include a Viterbi decoder that processes the categories in accordance with one or more category rules.

Referring to FIG. 1B, the user device 110 and/or the remote system 120 may perform homograph disambiguation of input text data to determine pre-processed input data. Additional details of components for performing homograph disambiguation are shown below in FIG. 4A. The user device 110 and/or the remote system 120 similarly processes (140) input data to determine first segment data corresponding to a first portion of the input data and second segment data corresponding to a second portion of the input data. The user device 110 and/or the remote system 120 similarly processes (142) the first segment data to determine first embedding data representing a first context of the first segment data with respect to the input data and the second segment data to determine second embedding data representing a second context of the second segment data with respect to the input data.

The user device 110 and/or the remote system 120 processes (144) the first embedding data and the second embedding data to determine pronunciation data indicating a first pronunciation corresponding to the first embedding data and a second pronunciation corresponding to the second embedding data. In other words, for each item of embedding data, a corresponding pronunciation is determined.

The user device 110 and/or the remote system 120 processes (146) the pronunciation data to determine output data representing at least a first word corresponding to the first segment data and to the second segment data. That is, words of the output data are determined based on the selected pronunciation of the segments.

Figure 2B:
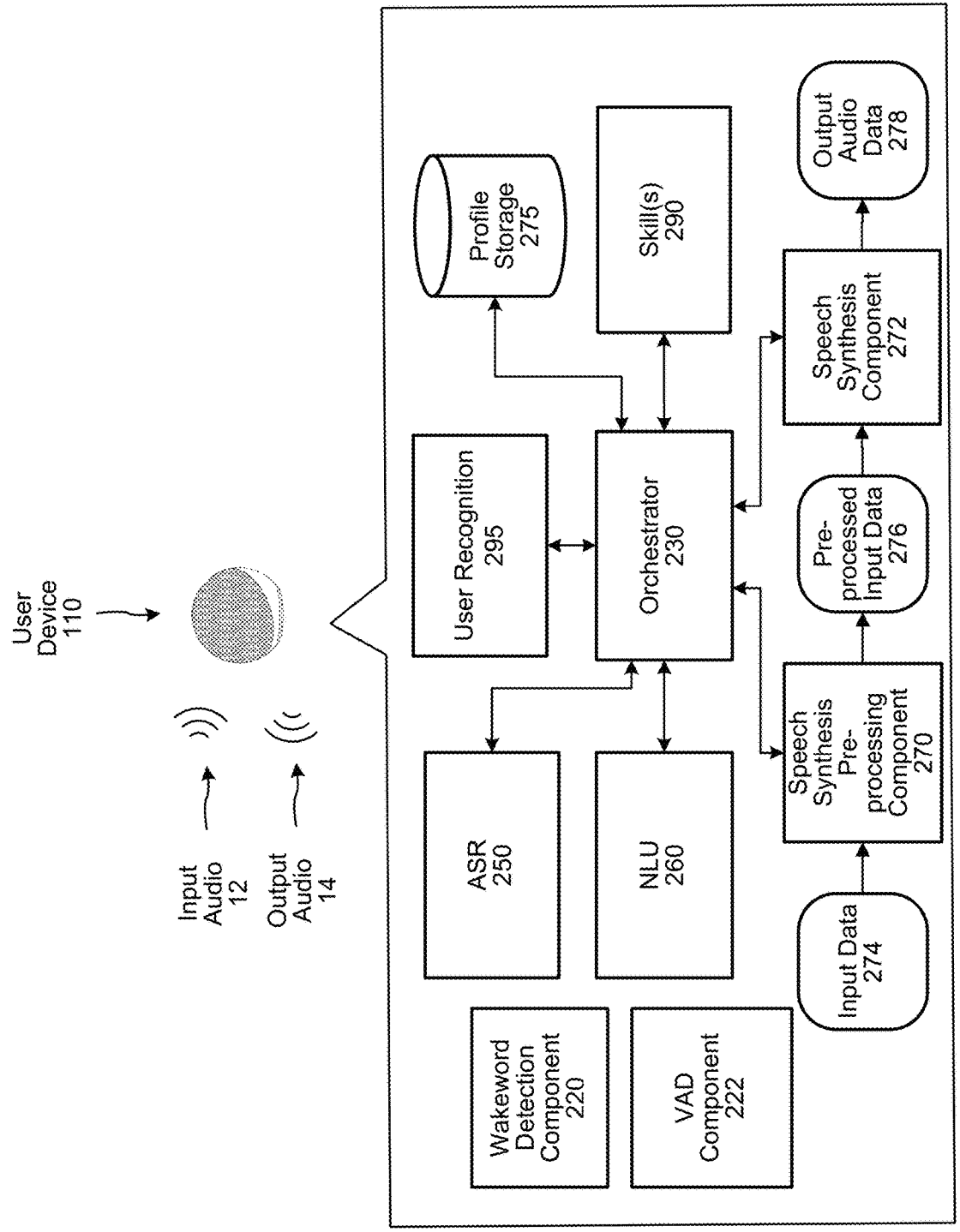
FIG. 2B illustrates components of a user device for speech processing according to embodiments of the present disclosure.

Referring to FIGS. 2A and 2B, a speech-synthesis pre-processing component 270 may process input data 274 to determine pre-processed input data 276, as described in greater detail herein, and a speech-synthesis component 272 may process the pre-processed input data 276 to determine output audio data 278 representing synthesized speech corresponding to the input data 274. Each of the speech-synthesis preprocessing component 270 and/or the speech-synthesis component 272 may process training data (e.g., audio data representing speech and text data corresponding to the speech) to train the speech-synthesis pre-processing component 270 or speech-synthesis component 272. Each of the speech-synthesis preprocessing component 270 and the speech-synthesis component 272 are described in greater detail herein.

Referring to FIG. 2A, the user device 110 may capture input audio 12 that includes speech and then either process the audio itself or transmit audio data 212 representing the audio 12 to the remote system 120 for further processing. The remote system 120 may have access to greater computing resources, such as more or faster computer processors, than does the user device, and may thus be able to process the audio data 212 and determine corresponding output data faster than the user device. The user device 110 may include a wakeword-determination component 222 that detects presence of a wakeword in audio and transmits corresponding audio data to the remote system only when (or after) the wakeword is detected. As used herein, a "wakeword" is one or more particular words, such as "Alexa," that a user of the user device may utter to cause the user device to begin processing the audio data, which may further include a representation of a command, such as "turn on the lights."

Referring also to FIG. 2B, the speech-processing system, including the speech synthesis preprocessing component 270 and the speech-synthesis component 272, may disposed wholly on the user device 110. In other embodiments, some additional components, such as an ASR component, are disposed on the user device 110, while other components are disposed on the remote system 120. Any distribution of the components of the speech-processing system of the present disclosure is, thus, within the scope of the present disclosure. The discussion herein thus pertains to both the distribution of components of FIGS. 2A and 2B and also to similar distributions.

The user device 110 or remote system 120 may further include an automatic speech-recognition (ASR) component that processes the audio data to determine corresponding text data and a natural-language understanding (NLU) component that processes the text data to determine the intent of the user expressed in the text data and thereby determine an appropriate response to the intent; the response may include the input data 274. The remote system 120 may determine and transmit data representing the response, which may include the output audio data 214, to the user device 110 (or other device), which may then output the response.

Before processing the audio data, the user device 110 may use various techniques to first determine whether the audio data includes a representation of an utterance of the user 10. For example, the user device 110 may use a voice-activity detection (VAD) component 222 to determine whether speech is represented in the audio data based on various quantitative aspects of the audio data, such as the spectral slope between one or more frames of the audio data, the energy levels of the audio data in one or more spectral bands the signal-to-noise ratios of the audio data in one or more spectral bands or other quantitative aspects. In other examples, the VAD component 222 may be a trained classifier configured to distinguish speech from background noise. The classifier may be a linear classifier, support vector machine, or decision tree. In still other examples, hidden Markov model (HMM) or Gaussian mixture model (GMM) techniques may be applied to compare the audio data to one or more acoustic models in speech storage; the acoustic models may include models corresponding to speech, noise (e.g., environmental noise or background noise), or silence.

If the VAD component 222 is being used and it determines the audio data includes speech, the wakeword-detection component 220 may only then activate to process the audio data to determine if a wakeword is likely represented therein. In other embodiments, the wakeword-detection component 220 may continually process the audio data (in, e.g., a system that does not include a VAD component.) The user device 110 may further include an ASR component for determining text data corresponding to speech represented in the input audio 12 and may send this text data to the remote system 120.

The trained model(s) of the VAD component 222 or wakeword-detection component 220 may be CNNs, RNNs, acoustic models, hidden Markov models (HMMs), or classifiers. These trained models may apply general large-vocabulary continuous speech recognition (LVCSR) systems to decode the audio signals, with wakeword searching conducted in the resulting lattices or confusion networks. Another approach for wakeword detection builds HMMs for each key wakeword word and non-wakeword speech signals respectively. The non-wakeword speech includes other spoken words, background noise, etc. There may be one or more HMMs built to model the non-wakeword speech characteristics, which may be referred to as filler models. Viterbi decoding may be used to search the best path in the decoding graph, and the decoding output is further processed to make the decision on wakeword presence. This approach can be extended to include discriminative information by incorporating a hybrid DNN-HMM decoding framework. In another example, the wakeword-detection component may use convolutional neural network (CNN)/recursive neural network (RNN) structures directly, without using a HMM. The wakeword-detection component may estimate the posteriors of wakewords with context information, either by stacking frames within a context window for a DNN, or using a RNN. Follow-on posterior threshold tuning or smoothing may be applied for decision making.

The remote system 120 may be used for additional audio processing after the user device 110 detects the wakeword or speech, potentially begins processing the audio data with ASR or NLU, or sends corresponding audio data 212. The remote system 120 may, in some circumstances, receive the audio data 212 from the user device 110 (or other devices or systems) and perform speech processing thereon. Each of the components illustrated in FIGS. 2A and 2B may thus be disposed on either the user device 110 or the remote system 120. The remote system 120 may be disposed in a location different from that of the user device 110 (e.g., a cloud server) or may be disposed in the same location as the user device 110 (e.g., a local hub server).

The audio data 212 may be sent to, for example, an orchestrator component 230 of the remote system 120. The orchestrator component 230 may include memory and logic that enables the orchestrator component 230 to transmit various pieces and forms of data to various components of the system 120. An ASR component 250, for example, may first transcribe the audio data into text data representing one more hypotheses corresponding to speech represented in the audio data 212. The ASR component 250 may transcribe the utterance in the audio data based on a similarity between the utterance and pre-established language models. For example, the ASR component 250 may compare the audio data with models for sounds (which may include, e.g., subword units, such as phonemes) and sequences of sounds represented in the audio data to identify words that match the sequence of sounds spoken in the utterance. These models may include, for example, one or more finite state transducers (FSTs). An FST may include a number of nodes connected by paths. The ASR component 250 may select a first node of the FST based on a similarity between it and a first subword unit of the audio data. The ASR component 250 may thereafter transition to second and subsequent nodes of the FST based on a similarity between subsequent subword units and based on a likelihood that a second subword unit follows a first.

After determining the text data, the ASR component 250 may send (either directly or via the orchestrator component 230) the text data to a corresponding NLU component 260. The text data output by the ASR component 260 may include a top-scoring hypothesis or may include an N-best list including multiple hypotheses (e.g., a list of ranked possible interpretations of text data that represents the audio data). The N-best list may additionally include a score associated with each hypothesis represented therein. Each score may indicate a confidence of ASR processing performed to generate the hypothesis with which it is associated.

The NLU component 260 may process the text data to determine a semantic interpretation of the words represented in the text data. That is, the NLU component 260 determines one or more meanings associated with the words represented in the text data based on individual words represented in the text data. The meanings may include a domain, an intent, and one or more entities. As those terms are used herein, a domain represents a general category associated with the command, such as "music" or "weather." An intent represents a type of the command, such as "play a song" or "tell me the forecast for tomorrow." An entity represents a specific person, place, or thing associated with the command, such as "Toto" or "Boston." The present disclosure is not, however, limited to only these categories associated with the meanings (referred to generally herein as "natural-understanding data," which may include data determined by the NLU component 260 or the dialog manager component.)

The NLU component 260 may determine an intent (e.g., an action that the user desires the user device 110 or remote system 120 to perform) represented by the text data or pertinent pieces of information in the text data that allow a device (e.g., the device 110, the system 120, etc.) to execute the intent. For example, if the text data corresponds to "play Africa by Toto," the NLU component 260 may determine that a user intended the system to output the song Africa performed by the band Toto, which the NLU component 260 determines is represented by a "play music" intent. The NLU component 260 may further process the speaker identifier 214 to determine the intent or output. For example, if the text data corresponds to "play my favorite Toto song," and if the identifier corresponds to "Speaker A," the NLU component may determine that the favorite Toto song of Speaker A is "Africa."

The user device 110 or remote system 120 may include one or more skills 290. A skill 290 may be software such as an application. That is, the skill 290 may enable the user device 110 or remote system 120 to execute specific functionality in order to provide data or produce some other output requested by the user 10. The user device 110 or remote system 120 may be configured with more than one skill 290.

In some instances, a skill 290 may provide text data, such as the input data 274, responsive to received NLU results data. The device 110 or system 120 may include the speech-synthesis preprocessing component 270 and/or the speech-synthesis component 272 that generate output audio data 278 from input data 274. The speech-synthesis component 272 may use one of a variety of speech-synthesis techniques. In one method of synthesis called unit selection, the speech-synthesis component 272 analyzes text data against a database of recorded speech. The speech-synthesis component 272 selects units of recorded speech matching the text data and concatenates the units together to form output audio data. In another method of synthesis called parametric synthesis, the speech-synthesis component 272 varies parameters such as frequency, volume, and noise to create output audio data including an artificial speech waveform. Parametric synthesis uses a computerized voice generator, sometimes called a vocoder. In another method of speech synthesis, a trained model, which may be a sequence-to-sequence model, directly generates output audio data based on the input text data, as shown in FIGS. 3A, 3B, 4A, 4B, and 5.

The user device 110 and/or remote system 120 may include a speaker-recognition component 295. The speaker-recognition component 295 may determine scores indicating whether the audio data 212 originated from a particular user or speaker. For example, a first score may indicate a likelihood that the audio data 212 is associated with a first synthesized voice and a second score may indicate a likelihood that the speech is associated with a second synthesized voice. The speaker recognition component 295 may also determine an overall confidence regarding the accuracy of speaker recognition operations. The speaker recognition component 295 may perform speaker recognition by comparing the audio data 212 to stored audio characteristics of other synthesized speech. Output of the speaker-recognition component 295 may be used to inform NLU processing as well as processing performed by the skill 290.

The user device 110 or remote system 120 may include a profile storage 275. The profile storage 275 may include a variety of information related to individual users or groups of users who interact with the device 110. The profile storage 275 may similarly include information related to individual speakers or groups of speakers that are not necessarily associated with a user account.

Each profile may be associated with a different user or speaker. A profile may be specific to one user or speaker or a group of users or speakers. For example, a profile may be a "household" profile that encompasses profiles associated with multiple users or speakers of a single household. A profile may include preferences shared by all the profiles encompassed thereby. Each profile encompassed under a single profile may include preferences specific to the user or speaker associated therewith. That is, each profile may include preferences unique from one or more user profiles encompassed by the same user profile. A profile may be a stand-alone profile or may be encompassed under another user profile. As illustrated, the profile storage 275 is implemented as part of the remote system 120. The profile storage 275 may, however, may be disposed on the user device 110 or in a different system in communication with the user device 110 or system 120, for example over the network 199. The profile data may be used to inform speech processing.

Each profile may include information indicating various devices, output capabilities of each of the various devices, or a location of each of the various devices 110. This device-profile data represents a profile specific to a device. For example, device-profile data may represent various profiles that are associated with the device 110, speech processing that was performed with respect to audio data received from the device 110, instances when the device 110 detected a wakeword, etc. In contrast, user- or speaker-profile data represents a profile specific to a user or speaker.

FIG. 3A illustrates components of a speech-synthesis pre-processing component 270a according to embodiments of the present disclosure. As described above, the speech-synthesis pre-processing component 270a processes input data 274 to determine pre-processed input data 276. The speech-synthesis pre-processing component 270a removes some or all of any ambiguities in the input data 274 in determining the pre-processed input data 276. This process may be referred to as text disambiguation.

In various embodiments, a text-segment determination component 302 processes the text input data 274 to determine segment data 312. The input data 274 may include characters, numbers, symbols, punctuation marks, and/or other components that form words, phrases, and/or sentences. In some embodiments, the input data 274 corresponds to a paragraph of text, and the other components of FIG. 3A process the paragraph of text in parallel. Any size of the input data 274 is, however, within the scope of the present disclosure. Longer sequences of input text may be processed by splicing the input data 274 together and/or by using an arbitrary-length contextual embeddings approach.

The text-segment determination component 302 may include a list of known segments for a particular language and output, in the segment data 312, a sequence of segments identified in the input data 274. Examples of segments in the segment data 312 include simple words (e.g., "the," "and," "book," and "read"), punctuation marks (e.g., ".," "?," and "!") and symbols (e.g., "$" and "#"). Longer words, such as compound words or words modified by a prefix or suffix, may be divided into two or more symbols, such as one segment for each word and other segments for each prefix or suffix. For example, the word "embedding" may be correspond to two segments: "embed," and "ding." The segments may each be associated with data, such as a Boolean flag, indicating whether they are preceded by whitespace or not. If the input data 274 corresponds to a language that uses symbols to represent words, such as Japanese, each segment may correspond to a symbol.

The text-segment encoder 304 processes the segment data 312 to determine segment embedding data 314. While the text-segment determination component 302 may process the input data 274 in series, the text segment encoder 304 may process each segment of the segment data 312 in parallel. In other words, the text-segment determination component 302 may process an entire paragraph of 274 to determine the segment data 312, and the text segment encoder 304 may process the segment data 312 only after the text-segment determination component 302 has completed processing the paragraph.

Each item of the segment embedding data 314 may correspond to one or more segments of the segment data 312. Each item of the segment embedding data 314 may represent the segment of the segment data 312 as well as context of a corresponding item of segment data 312 with respect to the input data 274. This context may include the position of the segment in a sentence or paragraph, one or more other segments or words adjacent to the segment, presence or absence of entities proximate the segment, or other such factors. Each item of the segment embedding data 314 may be a vector of floating-point numbers of dimension N. The text-segment encoder 304 may include one or more pairs of attention layers and feed-forward layers; further details of the segment encoder 304 are discussed below with respect to FIG. 5.

The category-labelling decoder 306 processes the segment embedding data 314 to determine segment category data 316. For each item of segment embedding data 314 that corresponds to a potentially ambiguous word and/or pronunciation of that word, the category-labelling decoder 306 may label that item segment embedding data 314 with a category that resolves the ambiguity; the segment category data 316 may include an indication of the originating text segment and an indication of the category. The category-labelling decoder 306 may include a plurality of classifiers; each classifier may be trained to recognize a particular item of segment embedding data 314 that is potentially ambiguous and output a category that resolves the ambiguity. Example ambiguities include verbs that are spelled the same but are pronounced differently for different tenses (e.g., "read"); the category-labelling decoder 306 may label such an item of segment embedding data 314 with a category corresponding to the selected tense (e.g., [present] or [past]). Other ambiguities include words that change pronunciation when used as a verb or used as a noun (e.g., "record"); the category-labelling decoder 306 may label such an item of segment embedding data 314 with a category corresponding to the selected usage (e.g., [verb] or [noun]). Still other examples include words that may be shortened forms (e.g., "sun" may be "sun" or "Sunday"); the category-labelling decoder 306 may label such an item of segment embedding data 314 with a category corresponding to the selected form (e.g., [sun] or [Sunday]).

In some embodiments, a category selected by the category-labelling decoder 306 may span multiple items of segment embedding data 314. For example, a cardinal number written with a thousand-place separator (e.g., "15,400") may be split into three items of segment data 312 (e.g., "15," ",", and "400") and three corresponding items of segment embedding data 314. In these embodiments, a single classifier of the category-labelling decoder 306 may process all three items, and the classifier may associate categories with the items to indicate that they are related to each other (e.g., "begin_cardinal_number," "continue_cardinal_number," and "continue_cardinal_number"). Further details of the category-labelling decoder 306 are discussed below with respect to FIG. 5.

As another example, a four-digit number (e.g., "1234") may be pronounced as a cardinal number (e.g., "one thousand, two hundred and thirty-four") in one context but as a time ("twelve thirty-four") in another context. The category labelling decoder 306 may thus process the segment embedding data 314 associated with the number to determine segment category data 316 that indicates a first category (e.g., "cardinal number") associated with the first pronunciation and a second category (e.g., "time number") associated with the second pronunciation and probabilities associated with each pronunciation. The segment-to-word selection component may process the segment category data 316 to determine which pronunciation should be indicated in the pre-processed input data 276.

A segment-to-word selection component 308 processes the segment category data 316 to determine the pre-processed input data 276. The segment-to-word selection component 308 may include a plurality of components, each configured to recognize a particular item (or items) of segment category data 316 and output a corresponding word. If two or more items of segment category data 316 are associated with each other (as in the cardinal number example described above), a single component may process the two or more items and output the corresponding word(s). Each component may correspond to computer instructions configured to recognize the item of segment category data 316 or may correspond to a neural-network model. In some embodiments, the segment-to-word selection component 308 further includes a Viterbi decoder to resolve any inconsistencies in the segment category data 316. Further details of the segment-to-word selection component 308 are described below with reference to FIG. 6.

Figure 3B:
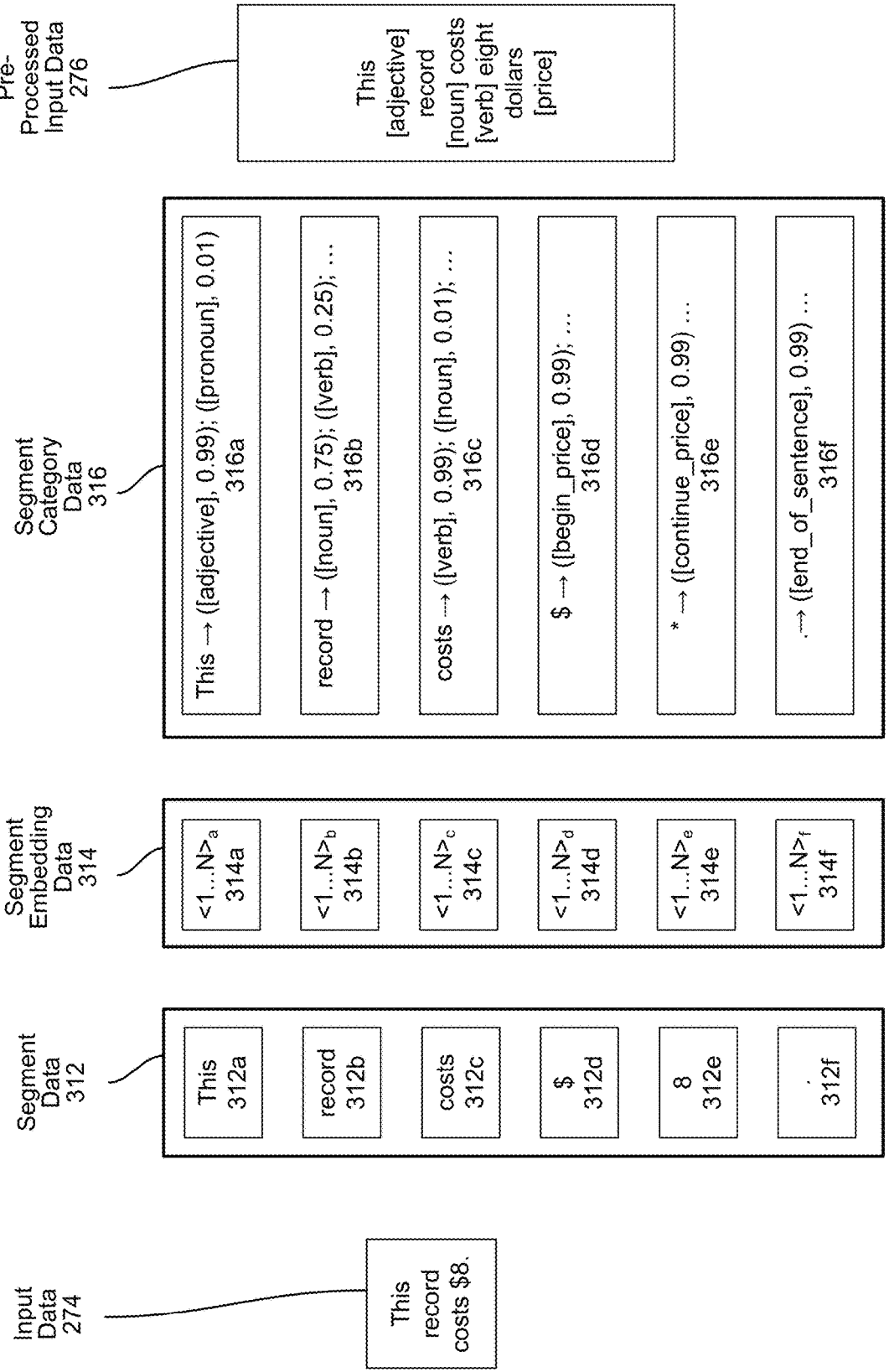
FIG. 3B illustrates data corresponding to pre-processing input data for speech processing according to embodiments of the present disclosure.

FIG. 3B illustrates data corresponding to pre-processing input text data for speech processing according to embodiments of the present disclosure. In some embodiments, for example, the input data 274 may correspond to the text, "This record costs $8." Potential ambiguities in this text may include the word "record," which may be pronounced differently if it is used as a verb or a noun, and the symbol and number "$8," which may be pronounced in a different order ("eight dollars") or with different words ("eight bucks").

FIG. 3B illustrates how the text-segment determination component 302 may determine the segment data 312. In this example, the text-segment determination component 302 determines six items of segment data 312, 312a ... 312f, that each correspond to a word or punctuation mark of the input data 274. As described above, the text-segment determination component 302 may determine each item of the segment data 312 in series.

The text segment encoder 304 may then process the items of segment data 312 in parallel to determine the segment embedding data 314, which may include a number of N-dimensional vectors of numbers 314a ... 314f. As described above, each item of the segment embedding data 314 may represent context information corresponding to each item of segment data 312.

The category labelling decoder 306 may then process the segment embedding data 314 to determine the segment category data 316, each item of which may include a list of possible categories and their associated probabilities. For some items of the segment category data 316 that are less ambiguous (e.g., the segment 312a corresponding to "This"), the corresponding item 316a of segment category data 316 may indicate that a single selected category is very probable (e.g., 0.99 probability). For other items of the segment category data 316 (e.g., the segment 312 corresponding to "record"), the corresponding item 316b of segment category data 316 may indicate that a first selected category has a first probability (e.g., 0.75 probability), while a second selected category has a second probability (e.g., 0.25 probability), indicating that the item of segment category data 316 may be ambiguous. The segment-to-word selection component 308 may then process the segment category data 316 to determine the pre-processed input data 276.

Figure 4A:
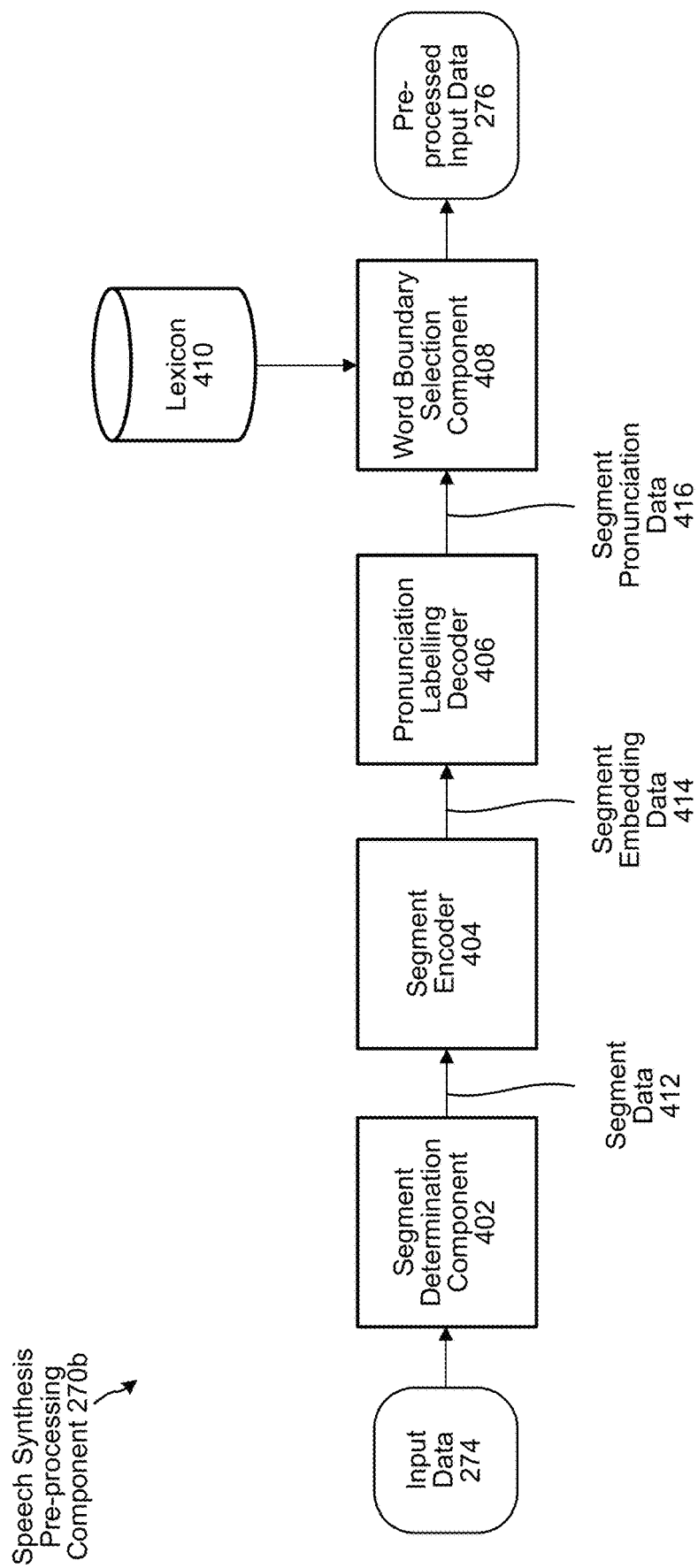
FIG. 4A illustrates further components for pre-processing input data for speech processing according to embodiments of the present disclosure.

FIG. 4A illustrates components for pre-processing input text data for speech processing according to embodiments of the present disclosure. In various embodiments, the speech-synthesis pre-processing component 270b of FIG. 4A processes input data 274 to resolve ambiguities corresponding to any homographs present in the input data 274. This process may be referred to as homograph disambiguation. As the term is used herein, a homograph is an item of text data that corresponds to two or more pronunciations; each pronunciation may be associated with a different meaning.

A segment determination component 402 may process input data 274 to determine text segment data 412. The segment determination component 402 may correspond to, and operate in a fashion akin to, the text segment determination component 302 discussed above. In some embodiments, the input data 274 corresponds to Japanese symbols; in these embodiments, the input data 274 may lack sentence boundaries (and/or other punctuation) and/or word boundaries (e.g., whitespace). In these embodiments, each item of text segment data 412 may correspond to one symbol in the input data 274.

A segment encoder 404 may process the text segment data 412 to determine text segment embedding data 414. The segment encoder 404 may similarly correspond to, and similarly operate in a fashion akin to, the segment encoder 404 discussed above. The text segment embedding data 414 may similarly represent a context of an item of text segment data 412 with respect to the input data 274, and may similarly include a number of N-vectors of floating-point values.

The speech-synthesis pre-processing component 270b may include a pronunciation-labelling decoder 406. This decoder may be similar in structure to the category-labelling decoder 306 of FIG. 3A, but may output segment pronunciation data 416 instead of the segment category data 316 discussed therein. The segment pronunciation data 416 may include, for each item of segment data 312, a list of potential pronunciations for the item, each associated with a corresponding probability of likelihood. The segment encoder 404 and the pronunciation labelling decoder 406 are similarly shown in greater detail in FIG. 5.

A word-boundary selection component 408 may process the segment pronunciation data 416 to determine the pre-processed input data 276. As explained above, in some languages such as Japanese, a single symbol may correspond to a single word or two or more symbols may correspond to a word. Thus, word boundaries may not be indicated by the input data 274, and a given item of the segment pronunciation data 416 may correspond to its own word or may be combined with one or more items to form a word. The word-boundary selection component 408 may compare items of the segment pronunciation data 416 to a set of known words in a lexicon 410 to determine word boundaries (and/or other boundaries, such as sentence or clause boundaries) and indicate those boundaries in the pre-processed input data 276. In some embodiments, the word-boundary selection component 408 uses a conditional random field (CRF) model to select words from the lexicon 410 to best match the segment pronunciation data 416.

Figure 4B:
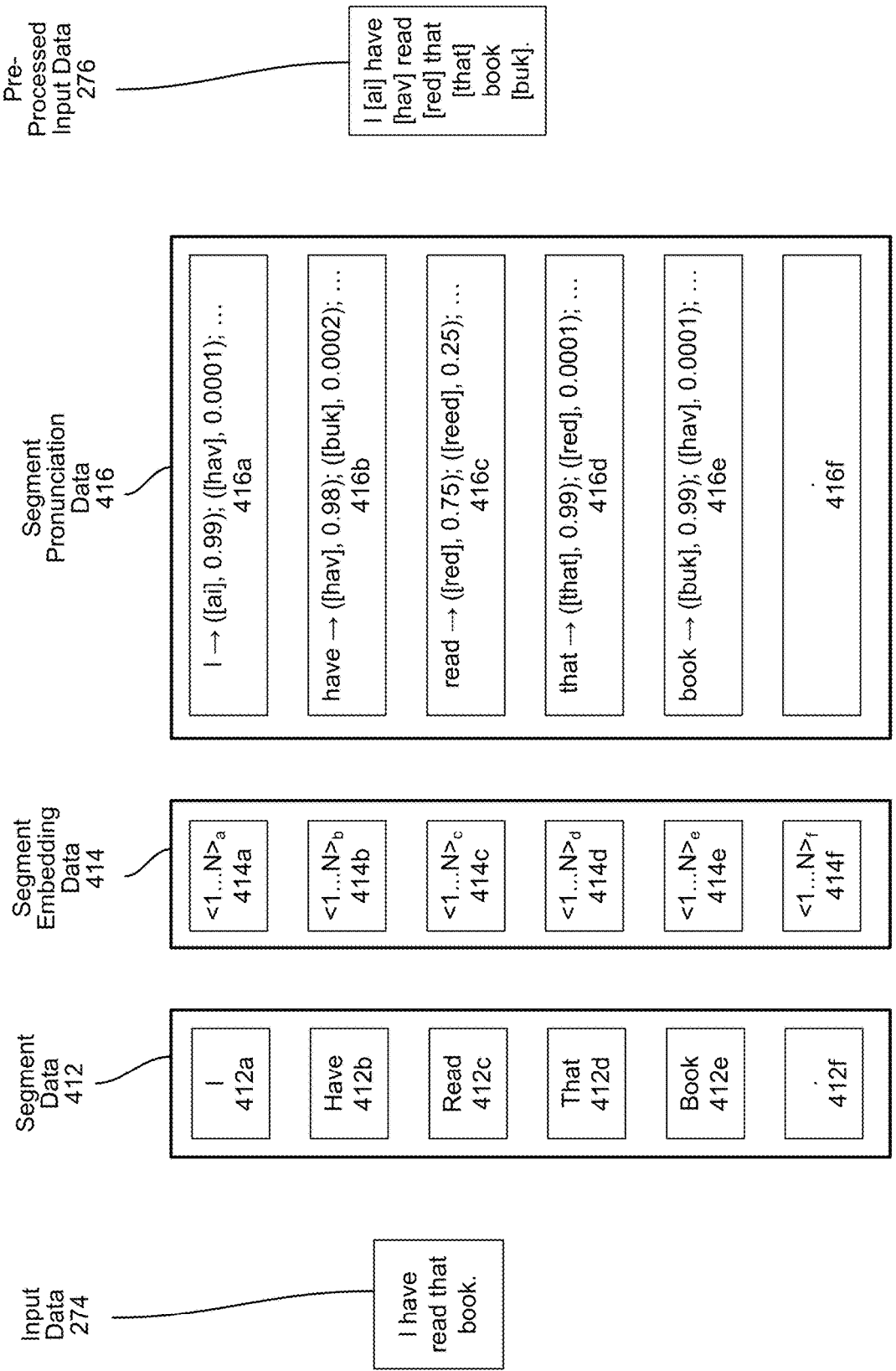
FIG. 4B illustrates further data corresponding to pre-processing input data for speech processing according to embodiments of the present disclosure.

FIG. 4B illustrates data corresponding to pre-processing input text data for speech processing according to embodiments of the present disclosure. In this example, the input data 274 includes the text "I have read that book." Note that, while the speech-synthesis pre-processing component 270b may be used for any language, such as Japanese, the example herein is given in English for clarity. The text-segment determination component 402 determines six items of segment data 412, 412a ... 412f, that each correspond to a word or punctuation mark of the input data 274. As described above, the text-segment determination component 402 may determine each item of the segment data 412 in series.

The segment encoder 404 may then process the items of segment data 412 in parallel to determine the segment embedding data 414, which may include a number of N-dimensional vectors of numbers 414a ... 414f. As described above, each item of the segment embedding data 414 may represent context information corresponding to each item of segment data 412.

The pronunciation labelling decoder 406 may then process the segment embedding data 414 to determine the segment pronunciation data 416, each item of which may include a list of possible pronunciations and their associated probabilities. For some items of the segment category data 416 that have a single primary pronunciation (e.g., the segment 412a corresponding to "I"), the corresponding item 416a of segment pronunciation data 416a may indicate that a single selected category is very probable (e.g., 0.99 probability). For other items of the segment category data 416 (e.g., the segment 412c corresponding to "read"), the corresponding item 416c of segment pronunciation data 316c may indicate that a first selected pronunciation has a first probability (e.g., 0.75 probability), while a second selected pronunciation has a second probability (e.g., 0.25 probability), indicating that the item of pronunciation category data 416 may be ambiguous. The word-boundary selection component 408 may then process the segment pronunciation data 416 to determine the pre-processed input data 276. In a language such as Japanese, the word-boundary selection component 408 may combine or separate one or more symbols to determine word boundaries.

Figure 5:
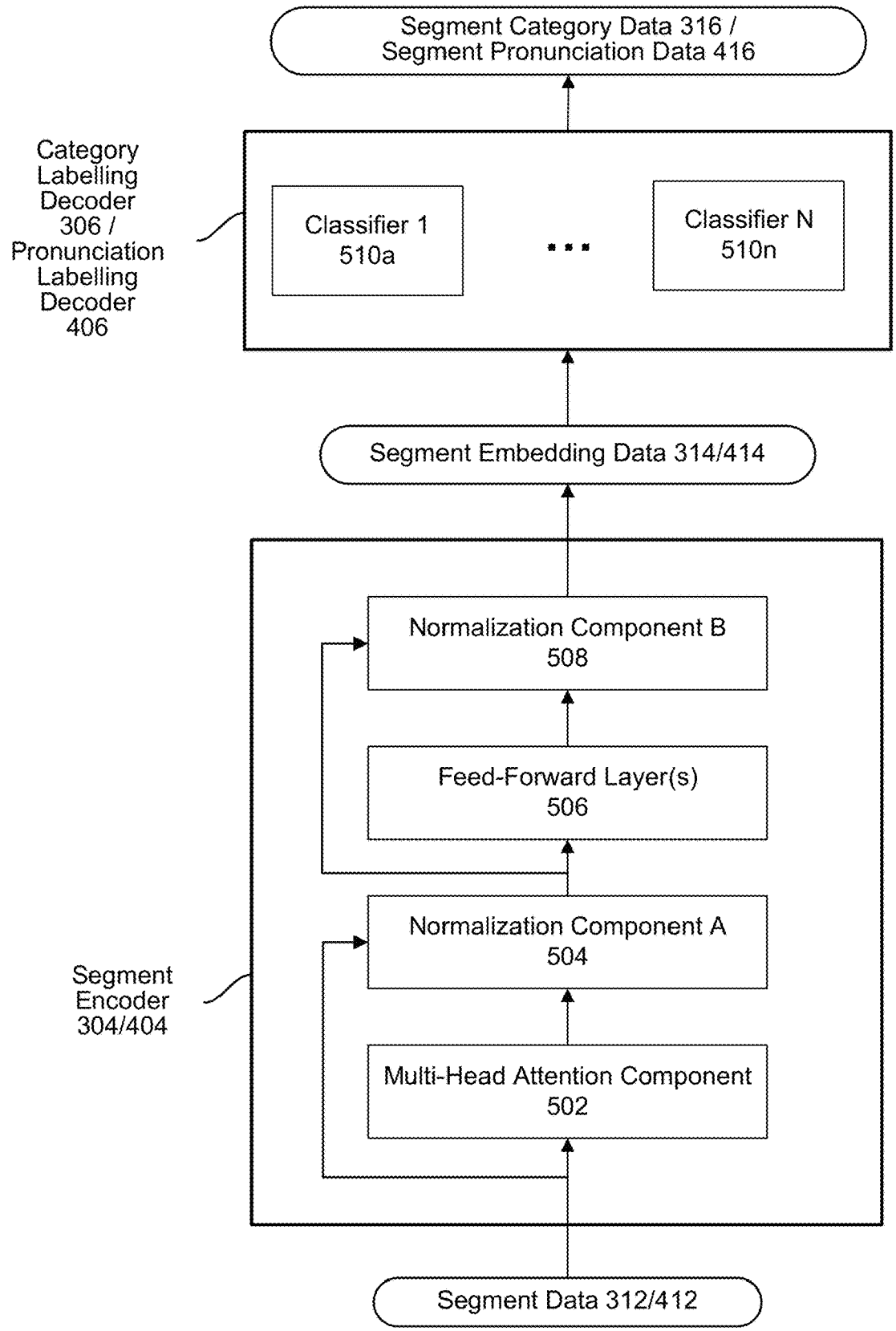
FIG. 5 illustrates an encoder and decoder for pre-processing data according to embodiments of the present disclosure.

FIG. 5 illustrates an encoder and decoder for pre-processing data according to embodiments of the present disclosure. The segment encoder 304 of FIG. 3A and/or the segment encoder 404 of FIG. 4A may include a multi-head attention component 502, a normalization component A 504, feed-forward layer(s) 506, and/or a normalization component 508. Collectively, these components may be referred to as a transformer; other types of encoders, such as CNN- or RNN-based encoders, are within the scope of the present disclosure.

The multi-head attention component 502 may process each item of the segment data 312/412 in parallel to produce M different outputs; each of the M outputs may be referred to as a "head" of the attention component 502, and when M>1 the attention component 502 may be referred to as a multi-head attention component. Each layer of the multi-head attention component 502 may determine query values Q, key values K, and values V corresponding to the previous layer. The output of that layer may then be given by the below equation (1), in which d refers to the dimension of the previous layer.

$$\text{Attenion}(Q, K, V) = \text{softmax}\left(\frac{QK^T}{\sqrt{d}}\right)V \quad (1)$$

A first normalization component A 504 may receive the output of the attention component 502 and, in some embodiments, one or more skip connections corresponding to the segment data 312/412. The first normalization component A 504 may perform a tan h, sigmoid, or other such function.

One or more feed-forward layers 506 may process the output of the first normalization component A 504. The feed-forward layers 506 may contain one or more layers of one or more nodes, each of which may perform a scaling, offset, or similar operation on its input data. The nodes may be fully connected or less than fully connected.

A second normalization component B 508 may receive the output of the feed-forward layer(s) and, in some embodiments, one or more skip connections corresponding to the output of the first normalization component A 504. The second normalization component b 508 may similarly perform a tan h, sigmoid, or other such function to determine the segment embedding data 314/414.

The category labelling decoder 306/pronunciation labelling decoder 406 may include one or more layers of feed-forward and/or recurrent nodes. In some embodiments, the category labelling decoder 306/pronunciation labelling decoder 406 includes a single layer of nodes. The nodes of the category labelling decoder 306/pronunciation labelling decoder 406 may be arranged as N classifiers 510a ... 510n; N may be any value, including 1. Each classifier 510 may determine an item of the segment category data 316/segment pronunciation data 416. A single classifier 510 may determine multiple items of the segment category data 316/segment pronunciation data 416.

In some embodiments, the encoder 304/404 and/or decoder 306/406 may be trained using a teacher/student architecture. The teacher architecture may correspond to a version of the encoder 304/404 and/or decoder 306/406 with more attention layers and/or feed-forward blocks, and the student architecture may correspond to a version of the encoder 304/404 and/or decoder 306/406 with fewer attention layers and/or feed-forward blocks. During or after training of the teacher architecture, one or more values of the nodes of the attention component 502 may be transferred from the teacher to the student, and one or more values of the segment embedding data 314/414 may be transferred from the teacher to the student. In some embodiments, the teacher architecture has 24 layers and 4 feed-forward network blocks, and the student architecture has 8 layers and 1 feed-forward network block. Any size or configuration for the teacher or the student is, however, within the scope of the present disclosure.

In some embodiments, the encoder 304/404 may be pre-trained by itself as a language model using unsupervised data to determine an embedding space defined by the segment embedding data 314/414. Once this pre-training is complete, the encoder 304/404 and decoder 306/406 may be trained together in a process that may be referred to as "fine-tuning."

Figure 6:
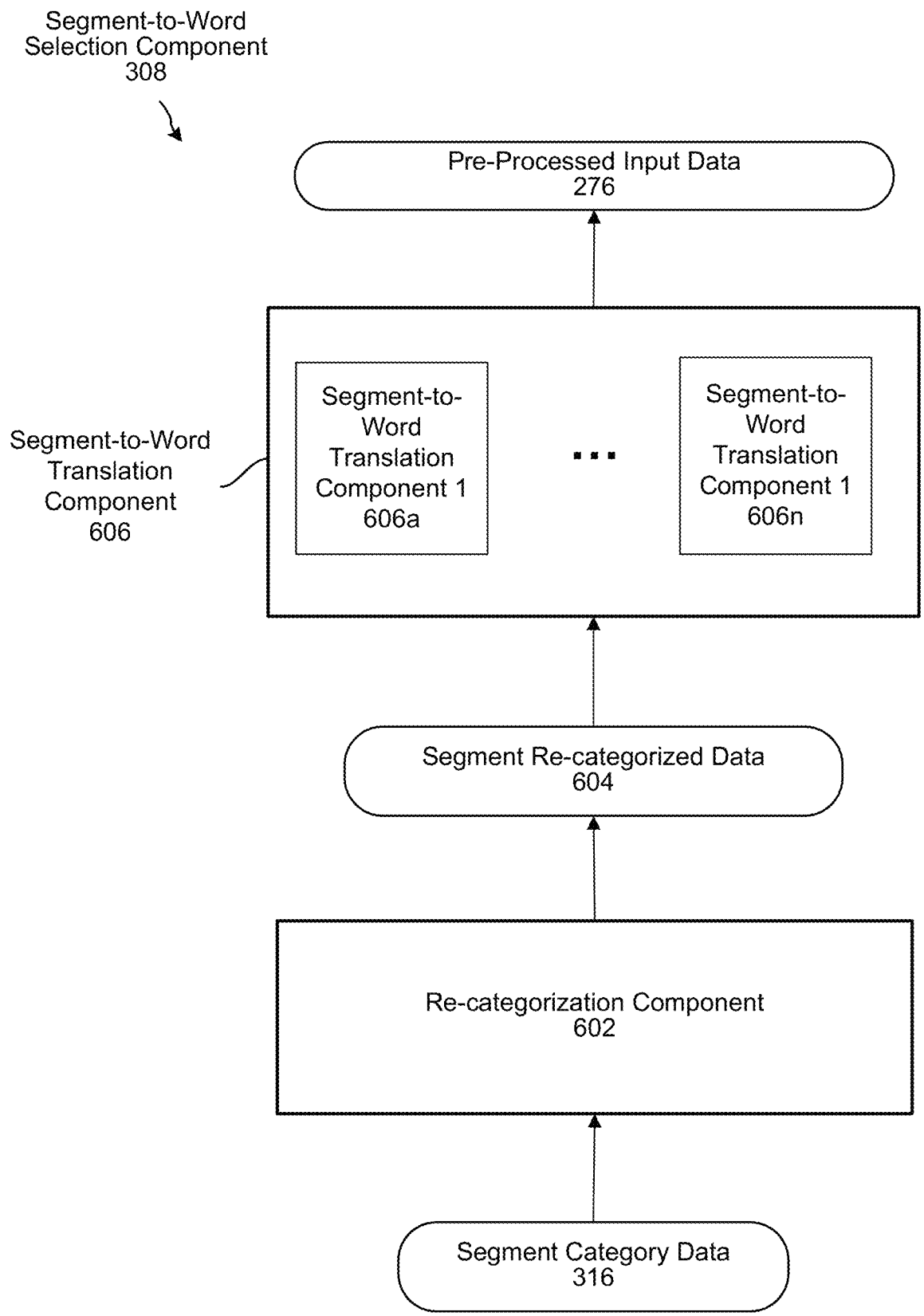
FIG. 6 illustrates components for determining pre-processed data according to embodiments of the present disclosure.

FIG. 6 illustrates an example embodiment of the segment-to-word selection component 308. In various embodiments, a re-categorization component 602 processes the segment category data 316 in accordance with one or more category rules to remove or correct any categories represented in the segment category data 316 that violate those category rules to thereby determine text segment re-categorized data 604. An example rule might be that, in a sequence of text segments and associated category data, a text segment having a category [continue_cardinal_number] is not allowed to precede a first text segment having a category [continue_cardinal_number]. If a sequence of the segment category data 316 is found to violate this rule, the re-categorization component 602 may re-order the text segments to comply with the rule. In various embodiments, the re-categorization component 602 may be implemented as a Viterbi decoder.

A segment-to-word translation component 606 may process the text segment re-categorized data 604 (or the segment category data 316, if the re-categorization component 602 is not used or is disabled) to determine the pre-processed input data 276. Each of a plurality of segment-to-word translation components 606a ... 606n may each translate an item of the text segment re-categorized data 604 into a corresponding word of the pre-processed input data 276. If a series of items of text segment re-categorized data 604 are associated with each other, the same segment-to-word translation component 606 may process each of the series.

Figure 7A:
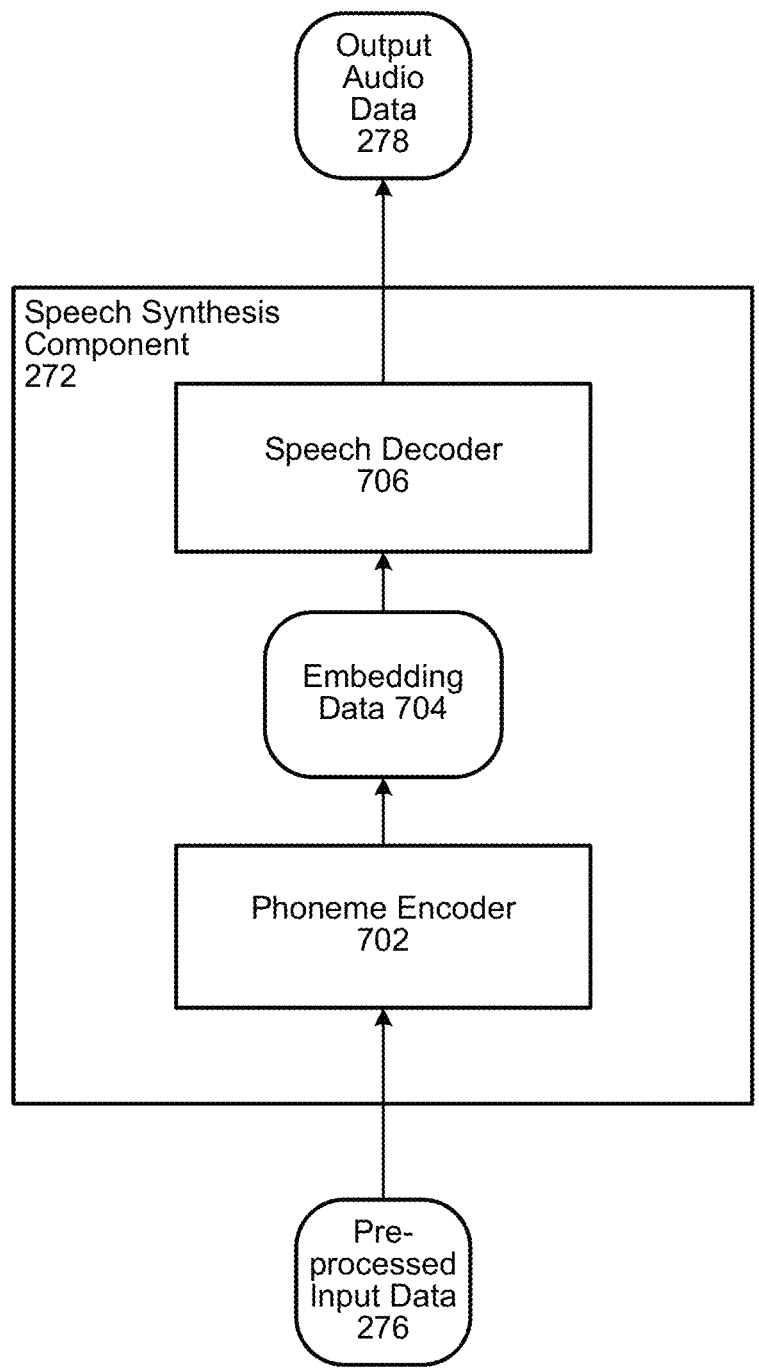
FIGS. 7A, 7B, and 7C illustrates components for speech synthesis according to embodiments of the present disclosure.
Figure 7B:
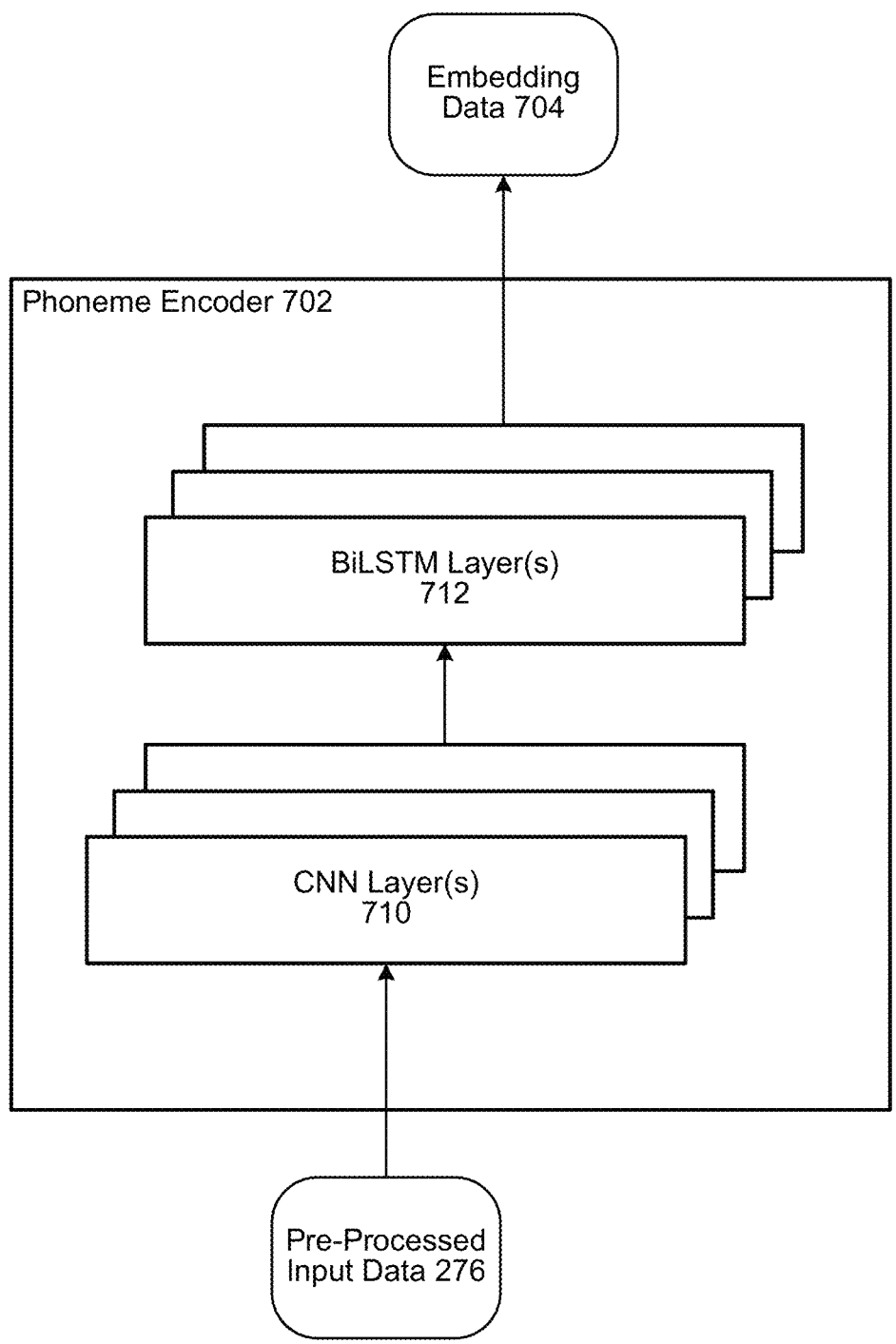
Figure 7C:
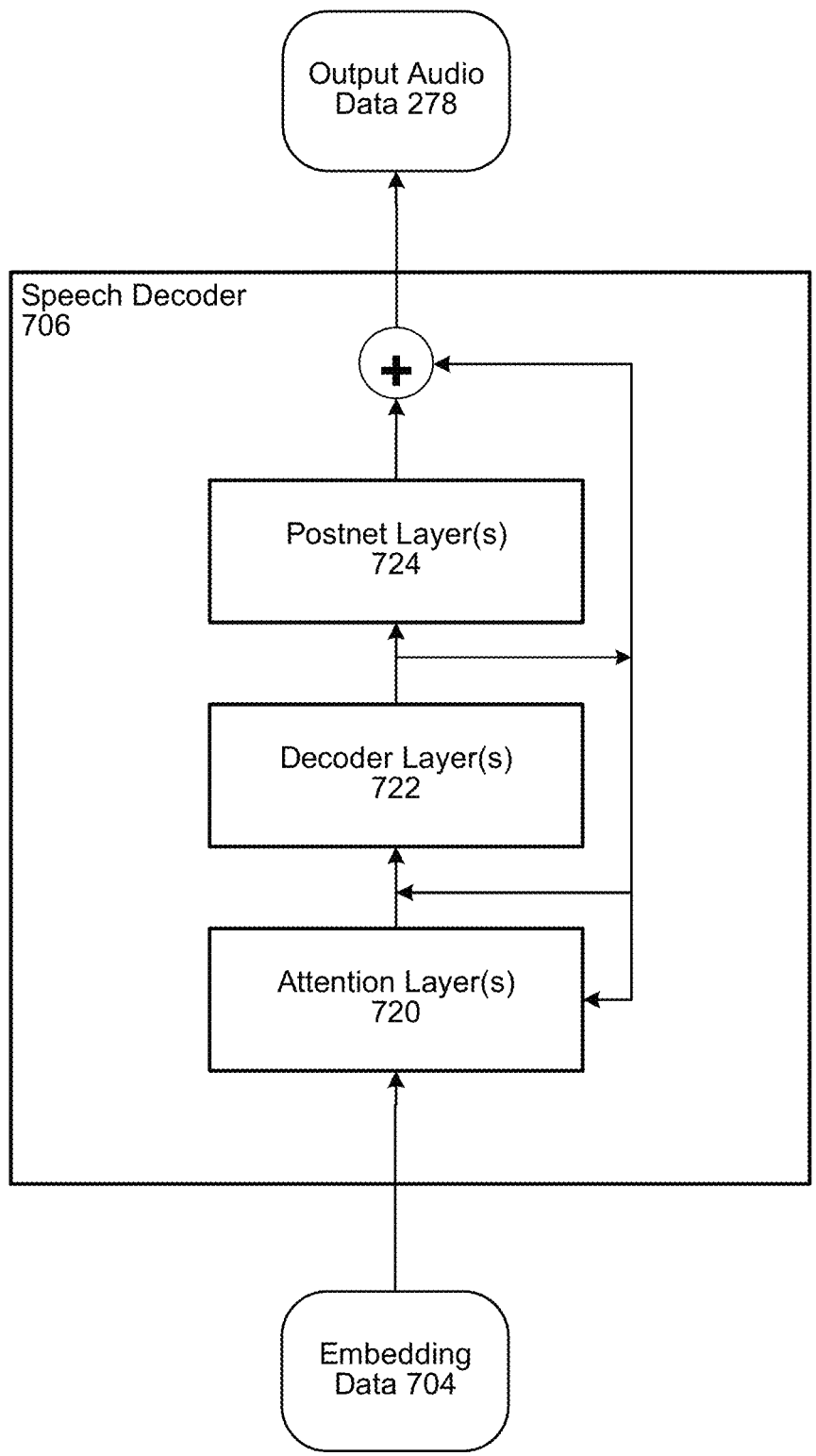

FIGS. 7A, 7B, and 7C illustrates components for speech synthesis according to embodiments of the present disclosure. Referring first to FIG. 7A, the speech-synthesis component 272 may include a phoneme encoder 702 (described in greater detail in FIG. 7B) that determines embedding data 704 given the pre-processed input data 276. The speech-synthesis component 272 may further include a speech decoder 706 (described in greater detail in FIG. 7C) that determines audio output data 278 given the embedding data 704. Such a speech-synthesis component 272 may be referred to as a "sequence-to-sequence" or "seq2seq" component. The present disclosure is not, however, limited to any particular type of speech-synthesis component 272, and other types, such as unit-selection types, are within the scope of the present disclosure.

Referring to FIG. 7B, one embodiment of the encoder 702 may include one or more convolutional neural network (CNN) layers 710 for processing input data (which may be the pre-processed input data 276). The pre-processed input data 276 may include one or more phonemes as determined by, for example, an acoustic model. The encoder 702 may further include one or more bidirectional long short-term memory (BiLSTM) layers 712 for processing the output(s) of the CNN layers 710 to determine embedding data 704. In some embodiments, the encoder 702 includes three CNN layers 710 and two BiLSTM layers 712. The present disclosure is not, however, limited to only these types and numbers of layers, and other deep neural network (DNN) or recurrent neural network (RNN) layers are within its scope.

FIG. 7C illustrates components of a speech decoder 706 according to embodiments of the present disclosure. The speech decoder 706 may include one or more decoder layer(s) 722, which may include one or more LSTM or BiLSTM layers. One or more attention layer(s) 720 may process input data, such as the embedding data 704, as well as one or more outputs of the decoder layer(s) 722 (e.g., the decoder may be auto-regressive). The attention layer(s) 720 may apply one or more weights to one or more of its inputs to thereby emphasize or "attend to" certain inputs over other inputs. One or more postnet layer(s) 724, such as linear projection, convolutional, and/or activation layers, may process the output(s) of the decoder layer(s) 722 to determine the output audio data 278, which may include mel-spectrogram data. A vocoder may process the output audio data 278 to determine time-domain audio data.

The decoder layers 722 may include a number of different components according to embodiments of the present disclosure. A BILSTM layer may process the embedding data 704. One or more CNN layer(s) may process the outputs of the BiLSTM layers, and one or more LSTM layer(s) may process the output(s) of the CNN layers to determine the output audio data 278. In some embodiments, the decoder layers 722 include one BiLSTM layer, three CNN layers, and three LSTM layers. In some embodiments, the output of the LSTM layer(s) is further processed by a postnet layer, which may include linear projection, convolutional, or activation layers, to determine the output audio data 278. The decoder layers 722 may correspond to a non-autoregressive decoder, in which the output audio data 278 is determined by processing the embedding data 704. In other embodiments, the decoder layers 722 may correspond to an autoregressive decoder, in which the output audio data 278 is determined by processing the embedding data 704 and at least one previously determined item of output audio data 278 (in other words, the output data is determined based at least in part on previously generated output data). Any type of decoder 706, including autoregressive and non-autoregressive decoders, is within the scope of the present disclosure.

FIG. 8 is a block diagram conceptually illustrating a user device 110. FIG. 9 is a block diagram conceptually illustrating example components of the remote system 120, which may be one or more servers and which may assist with voice-transfer processing, speech-synthesis processing, NLU processing, etc. The term "system" as used herein may refer to a traditional system as understood in a system/client computing structure but may also refer to a number of different computing components that may assist with the operations discussed herein. For example, a server may include one or more physical computing components (such as a rack system) that are connected to other devices/components either physically or over a network and is capable of performing computing operations. A server may also include one or more virtual machines that emulates a computer system and is run on one or across multiple devices. A server may also include other combinations of hardware, software, firmware, or the like to perform operations discussed herein. The server may be configured to operate using one or more of a client-system model, a computer bureau model, grid computing techniques, fog computing techniques, mainframe techniques, utility computing techniques, a peer-to-peer model, sandbox techniques, or other computing techniques.

Multiple servers may be included in the system 120, such as one or more servers for performing speech processing. In operation, each of these server (or groups of devices) may include computer-readable and computer-executable instructions that reside on the respective server, as will be discussed further below. Each of these devices/systems (110/120) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), or other types of memory. Each device (110/120) may also include a data storage component (808/908) for storing data and controller/processor-executable instructions. Each data storage component (808/908) may individually include one or more non-volatile storage types such as magnetic storage, optical storage, solid-state storage, etc. Each device (110/120) may also be connected to removable or external non-volatile memory or storage (such as a removable memory card, memory key drive, networked storage, etc.) through respective input/output device interfaces (802/902). The device 110 may further include loudspeaker(s) 812, microphone(s) 820, display(s) 816, or camera(s) 818.

Computer instructions for operating each device/system (110/120) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device/system (110/120) includes input/output device interfaces (802/902). A variety of components may be connected through the input/output device interfaces (802/902), as will be discussed further below. Additionally, each device (110/120) may include an address/data bus (824/924) for conveying data among components of the respective device. Each component within a device (110/120) may also be directly connected to other components in addition to (or instead of) being connected to other components across the bus (824/924).

Figure 10:
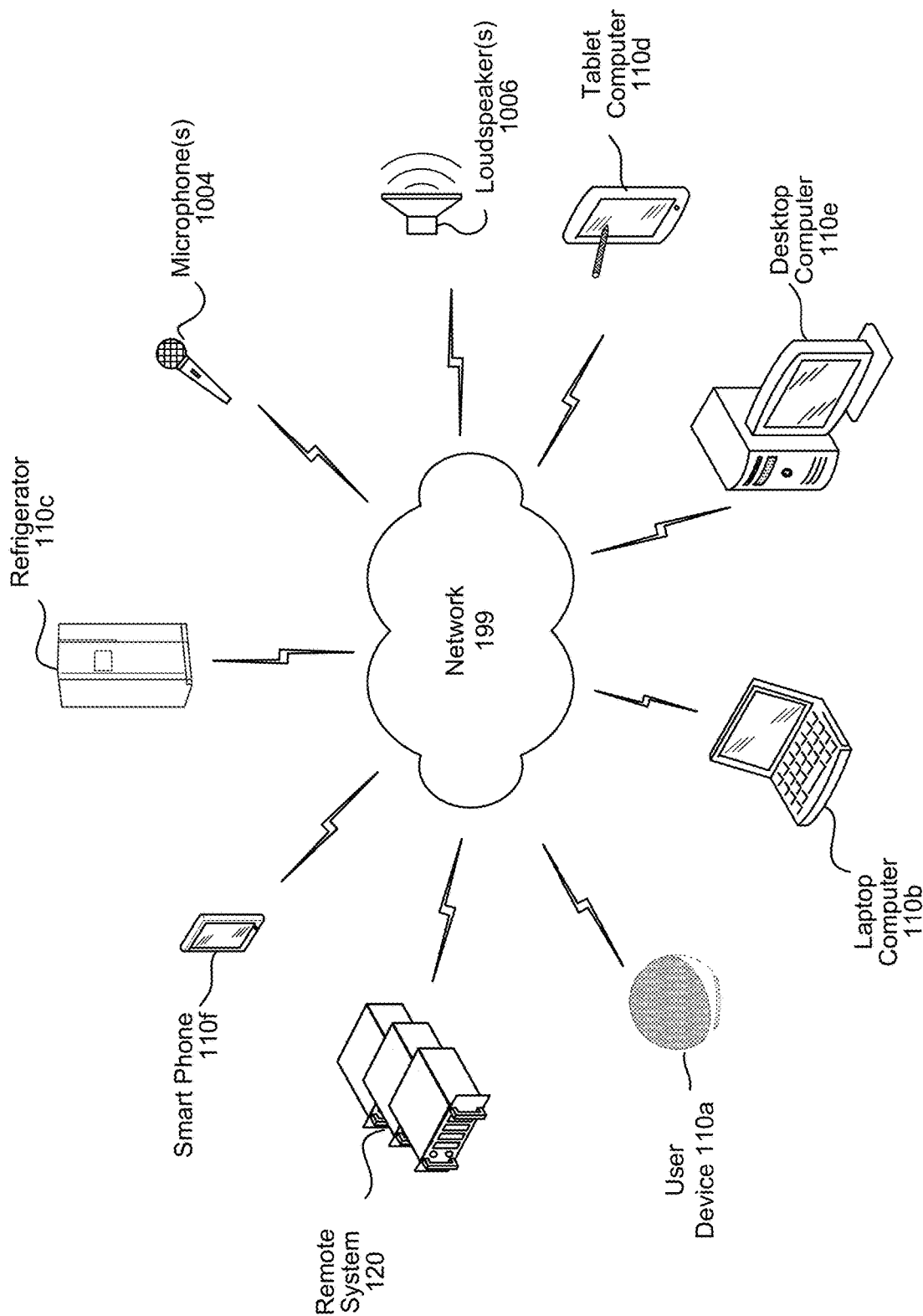
FIG. 10 illustrates a networked computing environment according to embodiments of the present disclosure.

Referring to FIG. 10, the device 110 may include input/output device interfaces 802 that connect to a variety of components such as an audio output component (e.g., a microphone 1004 or a loudspeaker 1006), a wired headset, or a wireless headset (not illustrated), or other component capable of outputting audio. The device 110 may also include an audio capture component. The audio capture component may be, for example, the microphone 820 or array of microphones, a wired headset, or a wireless headset, etc. If an array of microphones is included, approximate distance to a sound's point of origin may be determined by acoustic localization based on time and amplitude differences between sounds captured by different microphones of the array. The device 110 may additionally include a display for displaying content. The device 110 may further include a camera.

Via antenna(s) 814, the input/output device interfaces 802 may connect to one or more networks 199 via a wireless local area network (WLAN) (such as WiFi) radio, Bluetooth, or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical systems in a collection of systems or other components.

The components of the device(s) 110 or the system 120 may include their own dedicated processors, memory, or storage. Alternatively, one or more of the components of the device(s) 110 or the system 120 may utilize the I/O interfaces (802/902), processor(s) (804/904), memory (806/906), or storage (808/908) of the device(s) 110 or system 120.

As noted above, multiple devices may be employed in a single system. In such a multi-device system, each of the devices may include different components for performing different aspects of the system's processing. The multiple devices may include overlapping components. The components of the device 110 or the system 120, as described herein, are illustrative, and may be located as a stand-alone device or may be included, in whole or in part, as a component of a larger device or system.

The network 199 may further connect a voice-controlled user device 110a, a tablet computer 110d, a smart phone 110f, a refrigerator 110c, a desktop computer 110e, or a laptop computer 110b through a wireless service provider, over a WiFi or cellular network connection, or the like. Other devices may be included as network-connected support devices, such as a system 120. The support devices may connect to the network 199 through a wired connection or wireless connection. Networked devices 110 may capture audio using one-or-more built-in or connected microphones or audio-capture devices, with processing performed by components of the same device or another device connected via network 199. The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk or other media. In addition, components of one or more of the components and engines may be implemented as in firmware or hardware, such as the acoustic front end, which comprise among other things, analog or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements, or steps are in any way required for one or more embodiments or that one or more embodiments necessarily include logic for deciding, with or without other input or prompting, whether these features, elements, or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for processing text data for synthesized speech, the method comprising:
    receiving input data representing a number corresponding to a first pronunciation and to a second pronunciation;

processing the input data to determine first segment data corresponding to a first portion of the number;

processing the input data to determine second segment data corresponding to a second portion of the number;

processing, using a neural network attention layer of an encoder, the first segment data to determine first embedding data representing the first segment data and a first context of the first segment data with respect to the input data;

processing, using the neural network attention layer, the second segment data to determine second embedding data representing the second segment data and a second context of the second segment data with respect to the input data;

processing, using a decoder, the first embedding data to determine first category data indicating that the first embedding data corresponds to a first category associated with the first pronunciation, wherein processing the first embedding data comprises processing, using a first component, the first embedding data;

processing the second embedding data to determine second category data indicating that the second embedding data corresponds to a second category corresponding to the second pronunciation; and processing the first category data and the second category data to determine output data representing at least a first word corresponding to one of the first pronunciation and the second pronunciation.

2. The computer-implemented method of claim 1, wherein the first context corresponds to a first position of the first portion relative to the second portion and wherein the second context corresponds to a second position of the second portion relative to the first portion.

3. A computer-implemented method comprising:

receiving input data representing character data corresponding to a natural language output to be synthesized as speech;

processing the input data to determine first segment data corresponding to a first portion of the input data and second segment data corresponding to a second portion the input data;

processing, using a neural network attention layer of an encoder, the first segment data to determine first embedding data representing the first segment data and a first context of the first segment data with respect to the input data;

processing the second segment data to determine second embedding data representing the second segment data and a second context of the second segment data with respect to the input data;

processing, using at least one first component, the first embedding data and the second embedding data to determine category data indicating that the first embedding data corresponds to a first category and that the second embedding data corresponds to the first category, wherein the at least one first component comprises a first classifier portion corresponding to the first category and a second classifier portion corresponding to a second category;

processing the category data to determine output data representing at least a first word corresponding to the first segment data and at least a second word corresponding to the second segment data; and processing the output data to generate audio data corresponding to the input data.

4. The computer-implemented method of claim 3, wherein determining the first embedding data comprises:

processing, using a multi-head attention component, first data corresponding to the first segment data to determine second data, the multi-head attention component including the neural network attention layer; and processing, using a feed-forward layer, third data corresponding to the second data.

5. The computer-implemented method of claim 3, wherein processing the category data comprises:

processing, using a Viterbi decoder, the category data in accordance with at least one category rule.

6. The computer-implemented method of claim 3, wherein:

the second segment data is determined after the first segment data is determined, and processing the first segment data is performed in parallel with processing the second segment data.

7. The computer-implemented method of claim 3, further comprising:

determining a first probability that the first embedding data corresponds to the first category; and determining a second probability that the second embedding data corresponds to the first category.

8. The computer-implemented method of claim 3, further comprising:

processing, using a phoneme encoder, the output data to determine third embedding data; and processing, using, a speech decoder, the third embedding data to determine the audio data.

9. The computer-implemented method of claim 3, further comprising:

processing the input data to determine third segment data corresponding to a third portion of the input data;

processing the third segment data to determine third embedding data representing a third context of the third segment data with respect to the input data;

processing the third embedding data to determine pronunciation data indicating a pronunciation of the third portion; and processing the pronunciation data to determine second output data representing at least a third word corresponding to the third segment data.

10. The computer-implemented method of claim 9, further comprising:

determining, in the input data, a word boundary corresponding to the third portion.

11. The computer-implemented method of claim 3, wherein the at least one first component is a first decoder component.

12. A system comprising:

at least one processor; and at least one memory including instructions that, when executed by the at least one processor, cause the system to:

receive input data representing character data corresponding to a natural language output to be synthesized as speech;

process the input data determine first segment data corresponding to a first portion of the input data and second segment data corresponding to a second portion of the input data;

process, using a multi-head attention component of an encoder, the first segment data to determine first data;

processing the first data using a feed-forward layer of the encoder to determine first embedding data representing the first segment data and a first context of the first segment data with respect to the input data;

process the second segment data to determine second embedding data representing the second segment data and a second context of the second segment data with respect to the input data;

process the first embedding data and the second embedding data to determine category data indicating that the first embedding data corresponds to a first category and that the second embedding data corresponds to the first category;

process the category data to determine output data representing at least a first word corresponding to the first segment data and at least a second word corresponding to the second segment data; and process the output data to generate audio data corresponding to the input data.

13. The system of claim 12, wherein the at least one memory includes further instructions for determining the category data that, when executed by the at least one processor, further cause the system to:

determine a classifier corresponding to the first embedding data; and process, using the classifier, the first embedding data.

14. The system of claim 12, wherein the at least one memory includes further instructions for processing the category data that, when executed by the at least one processor, further cause the system to:

process, using a Viterbi decoder, the category data in accordance with at least one category rule.

15. The system of claim 12, wherein:

the second segment data is determined after the first segment data is determined, and the instructions for processing the first segment data are performed in parallel with the instructions for processing the second segment data.

16. The system of claim 12, wherein the at least one memory includes further instructions that, when executed by the at least one processor, further cause the system to:

determine a first probability that the first embedding data corresponds to the first category; and determine a second probability that the second embedding data corresponds to the first category.

17. The system of claim 12, wherein the at least one memory includes further instructions that, when executed by the at least one processor, further cause the system to:

process, using a phoneme encoder, the output data to determine third embedding data; and process, using, a speech decoder, the third embedding data to determine the audio data.

18. The system of claim 12, wherein the at least one memory includes further instructions that, when executed by the at least one processor, further cause the system to:

process the input data to determine third segment data corresponding to a third portion of the input data;

process the third segment data to determine third embedding data representing a third context of the third segment data with respect to the input data;

process the third embedding data to determine pronunciation data indicating a pronunciation of the third portion; and process the pronunciation data to determine second output data representing at least a third word corresponding to the third segment data.

19. The system of claim 18, wherein the at least one memory includes further instructions that, when executed by the at least one processor, further cause the system to:

determine, in the input data, a word boundary corresponding to the third portion.

* * * * *